United States Patent
Nakanishi et al.

(10) Patent No.: US 6,486,637 B1
(45) Date of Patent: Nov. 26, 2002

(54) BATTERY PACK CONTROLLING APPARATUS

(75) Inventors: Toshiaki Nakanishi, Aichi (JP); Masahiro Takada, Aichi (JP); Hirotaka Ishihara, Osaka (JP); Kiwamu Inui, Aichi (JP); Kunio Kanamaru, Aichi (JP); Yoshiaki Kikuchi, Aichi (JP)

(73) Assignees: Matsushita Electric Industrial Co. Ltd., Osaka (JP); Toyota Jidosha Kabushiki Kaisha, Aichi (JP)

( * ) Notice: Subject to any disclaimer, the term of this patent is extended or adjusted under 35 U.S.C. 154(b) by 0 days.

(21) Appl. No.: 09/696,367

(22) Filed: Oct. 25, 2000

(30) Foreign Application Priority Data

Oct. 25, 1999 (JP) ............................................. 11-303178
Oct. 23, 2000 (JP) ............................................. 12-322921

(51) Int. Cl.⁷ ............................................. H01M 10/46
(52) U.S. Cl. ..................................................... 320/150
(58) Field of Search ................................. 320/116, 118, 320/119, 132, 134, 136, 150, 152

(56) References Cited

U.S. PATENT DOCUMENTS

| | | | |
|---|---|---|---|
| 4,433,294 A | | 2/1984 | Windebank |
| 4,692,682 A | * | 9/1987 | Lane et al. |
| 5,170,124 A | | 12/1992 | Blair et al. |
| 5,581,170 A | | 12/1996 | Mammano et al. |
| 5,773,956 A | * | 6/1998 | Wieczorek |
| 6,044,331 A | | 3/2000 | Saigo |
| 6,163,135 A | * | 12/2000 | Nakayama et al. |
| 6,222,345 B1 | | 4/2001 | Yamanashi |

FOREIGN PATENT DOCUMENTS

| | | |
|---|---|---|
| JP | 08-140206 | 5/1996 |
| JP | 11-004545 | 1/1999 |

\* cited by examiner

*Primary Examiner*—Edward H. Tso
(74) *Attorney, Agent, or Firm*—Michael K. Kelly; Snell & Wilmer, LLP

(57) ABSTRACT

A battery pack controlling apparatus for controlling input to or output from a battery pack is provided. The battery pack includes a plurality of blocks in series connection. Each of the plurality of blocks includes a plurality of batteries in series connection. The battery pack controlling apparatus includes: a battery power input/output section for controlling input and output of battery power to and from the battery pack; a block voltage detection section for detecting a block voltage of each of the plurality of blocks; a battery current detection section for detecting a battery current of the battery pack; an unusual heating detection section for detecting unusual heating of at least one of the plurality of batteries based on the block voltage and the battery current; and a vehicle controlling section for controlling the battery power input/output section based on results of unusual heating detection by the unusual heating detection section. The unusual heating detection section includes an internal resistance calculation section for calculating an internal resistance of each of the plurality of blocks based on the block voltage and the battery current. The unusual heating detection section detects unusual heating of the at least one of the plurality of batteries based on the internal resistance of each of the plurality of blocks and a predetermined threshold value.

8 Claims, 23 Drawing Sheets

Battery input/output restriction signal calculation process

BATTERY PACK CONTROLLING APPARATUS

BACKGROUND OF THE INVENTION

1. Field of the Invention

The present invention relates to a battery pack controlling apparatus. In particular, the present invention relates to a battery pack controlling apparatus for detecting unusual heating of at least one of a number of cells or battery modules constituting a battery pack.

2. Description of the Related Art

Japanese Laid-Open Patent Publication No. 10-270094 discloses an apparatus for detecting unusual heating of a battery. In accordance with the disclosed apparatus for detecting unusual heating of a battery, a temperature sensor whose electrical resistance rapidly increases with an increase in temperature is externally mounted to each one of a number of cells, and the resistance values of all such temperature sensors in series connection are measured, whereby unusual heating of the cells can be detected. The detection of unusual heating of the cells is necessary for security concerns.

However, the aforementioned apparatus for detecting unusual heating of a battery disclosed in Japanese Laid-Open Patent Publication No. 10-270094 requires that a temperature sensor be mounted to each one of a number of cells just for the sake of detection of unusual heating of the cells, and therefore is not cost efficient.

Moreover, this laid-open publication fails to mention controlling the input and/or output of the battery pack upon detection of unusual heating of a cell.

Since there are as many temperature sensors in series connection as there are cells, the resistance value of all of the temperature sensors for the entire battery pack is equal to a multiple of the resistance value of each temperature sensor by a factor of the number of cells.

Therefore, in order to enable detection of an unusual heating of any cell in such a manner that the unusual heating will not be obscured by the changing resistance of the entire battery pack responsive to temperature changes, it is necessary to employ temperature sensors whose resistance values exhibit a sharp change at a point of inflection.

If each cell experiences a relatively small increase in temperature, then the resistance value of the associated temperature sensor will not reach a point of inflection, so that the temperature increase will be obscured by the changing resistance of the temperature sensors of the entire battery pack. Therefore, it is impossible to achieve stepwise control of the input and/or output of each cell based on the detection of minute changes in the resistance of the cells.

SUMMARY OF THE INVENTION

According to the present invention, there is provided a battery pack controlling apparatus for controlling input to or output from a battery pack, wherein: the battery pack includes a plurality of blocks in series connection; and each of the plurality of blocks includes a plurality of batteries in series connection, the battery pack controlling apparatus including: a battery power input/output section for controlling input and output of battery power to and from the battery pack; a block voltage detection section for detecting a block voltage of each of the plurality of blocks; a battery current detection section for detecting a battery current of the battery pack; an unusual heating detection section for detecting unusual heating of at least one of the plurality of batteries based on the block voltage and the battery current; and a vehicle controlling section for controlling the battery power input/output section based on results of unusual heating detection by the unusual heating detection section, wherein the unusual heating detection section includes an internal resistance calculation section for calculating an internal resistance of each of the plurality of blocks based on the block voltage and the battery current, and wherein the unusual heating detection section detects unusual heating of the at least one of the plurality of batteries based on the internal resistance of each of the plurality of blocks and a predetermined threshold value.

In one embodiment of the invention, the battery pack controlling apparatus further includes a battery temperature detection section for detecting a battery temperature of the battery pack; the unusual heating detection section further includes a threshold value setting section for setting the predetermined threshold value based on the battery temperature of the battery pack; and the unusual heating detection section detects unusual heating of the at least one of the plurality of batteries based on the internal resistance of each of the plurality of blocks and the predetermined threshold value as set by the threshold value setting section.

In another embodiment of the invention, the vehicle controlling section controls the battery power input/output section in a stepwise manner based on results of unusual heating detection by the unusual heating detection section.

In still another embodiment of the invention, the unusual heating detection section further includes: a variance calculation section for calculating an average value and a variance $\sigma^2$ of the block voltages of the plurality of blocks; and a variance unusual heating detection section for detecting unusual rising of the internal resistance of the at least one of the plurality of batteries based on the block voltage of each of the plurality of blocks, the average value, and the variance $\sigma^2$, and wherein the vehicle controlling section controls the battery power input/output section based on results of unusual rising detection by the variance unusual heating detection section.

In still another embodiment of the invention, the variance unusual heating detection section determines unusual rising of the internal resistance of the at least one of the plurality of batteries when at least one of the block voltages is equal to or greater than a predetermined value at a time of charging or when at least one of the block voltages is equal to or smaller than a predetermined value at a time of discharging.

In still another embodiment of the invention, the variance calculation section calculates an average voltage difference value representing an average of voltage differences between the block voltage at a first time and the block voltage at a second time as well as a voltage difference variance representing a variance of the voltage differences, and the variance unusual heating detection section detects unusual rising of the internal resistance of the at least one of the plurality of batteries based on the voltage differences, the average voltage difference value, and the voltage difference variance.

In still another embodiment of the invention, the first time includes a point in time at which the battery current detected by the battery current detection section is substantially zero.

In still another embodiment of the invention, the unusual heating detection section includes a available capacity unusual heating detection section for detecting unusual rising of the internal resistance of the at least one of the plurality of batteries based on high available capacity diagnosis and low available capacity diagnosis for respective ones of the plurality of blocks, and the vehicle controlling section controls the battery power input/output section based on results of unusual rising detection by the available capacity unusual heating detection section.

Thus, the invention described herein makes possible the advantages of (1) providing an economical battery pack controlling apparatus which obviates the need for mounting a temperature sensor to each one of a number of cells; (2) providing a battery pack controlling apparatus which is capable of controlling the input and output of a battery pack responsive to an increase in the temperature of a cell, so as to prevent the cell from remaining in an abnormal condition; and (3) providing a battery pack controlling apparatus which is capable of controlling the increase in the temperature of cells, so that the entire battery pack can sustain a longer period of use.

These and other advantages of the present invention will become apparent to those skilled in the art upon reading and understanding the following detailed description with reference to the accompanying figures.

DESCRIPTION OF THE PREFERRED EMBODIMENTS

EXAMPLE 1

Figure 1:
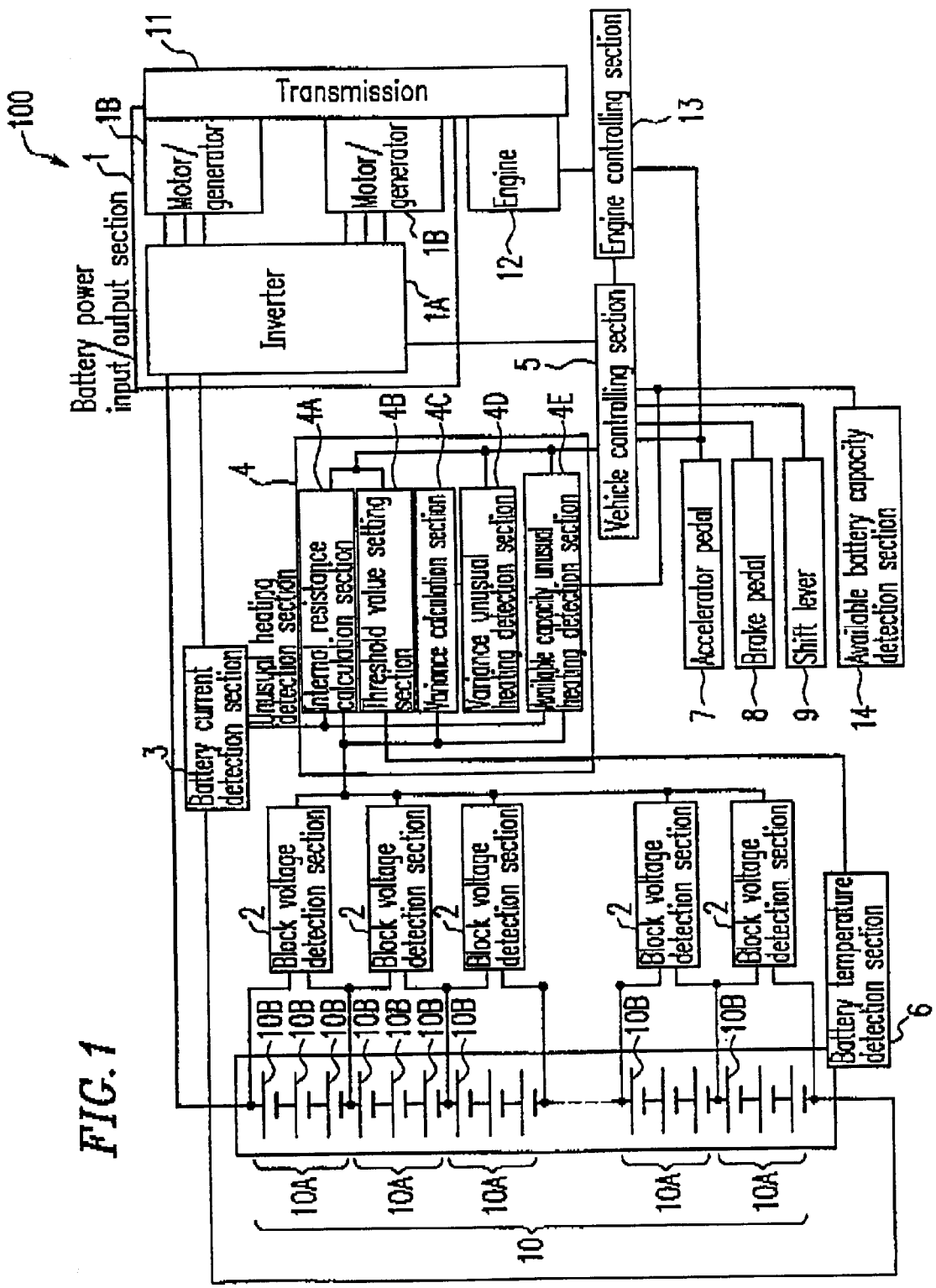
FIG. 1 is a block diagram illustrating an exemplary structure of a battery pack controlling apparatus 100 according to Example 1 of the present invention.

FIG. 1 illustrates an exemplary structure of a battery pack controlling apparatus 100 according to Example 1 of the present invention, where the battery pack controlling apparatus 100 is mounted in a hybrid vehicle. The battery pack controlling apparatus 100 controls the input and output of a battery pack 10. The battery pack 10 includes a plurality of blocks 10A which are in series connection. Each block 10A includes a plurality of cells 10B which are in series connection.

The battery pack controlling apparatus 100 includes: a battery power input/output section 1 for controlling the input and output of the battery power to and from the battery pack 10; block voltage detection sections 2, each of which detects the block voltage of an associated block 10A; a battery current detection section 3 for detecting a battery current of the battery pack 10; an unusual heating detection section 4 for detecting an unusual heating of the cells 10B based on the block voltages and the battery current; a vehicle controlling section 5 for controlling the battery power input/output section 1 based on results of the unusual heating detection by the unusual heating detection section 4; and a battery temperature detection section 6 for detecting the temperature of the battery pack 10.

The unusual heating detection section 4 includes: an internal resistance calculation section 4A for calculating the internal resistance of each of the plurality of blocks 10A based on the block voltage and the battery current; a threshold value setting section 4B for setting a threshold value based on the temperature of the battery pack 10; a variance calculation section 4C for calculating an average value and a variance $\sigma^2$ of the block voltages of the plurality of blocks 10A; a variance unusual heating detection section 4D for detecting an unusual heating of one or more cells 10B based on the block voltage of each block 10A as well as the average value and variance $\sigma^2$ of the block voltages; and a available capacity unusual heating detection section 4E for detecting an unusual heating of one or more cells 10B based on the available capacity of each block 10A.

The battery power input/output section 1 includes an inverter 1A and a motor/generator 1B of the hybrid vehicle. The motor/generator 1B drives an engine 12 via a transmission 11. An engine controlling section 13 controls the engine 12 based on the output of the vehicle controlling section 5. The vehicle controlling section 5 is coupled to an accelerator pedal 7, a brake pedal 8, a shift lever 9, and a available battery capacity detection section 14.

The unusual heating detection section 4 detects unusual heating of one or more cells 10B based on the internal resistance of each block 10A and the threshold value which is set by the threshold value setting section 4B.

The vehicle controlling section 5 controls the battery power input/output section 1 based on the results of unusual heating detection by the unusual heating detection section 4. The vehicle controlling section 5 controls the amount of current supplied to the inverter 1A based on an output from the accelerator pedal 7, an output from the brake pedal 8, an output from the shift lever 9, and an output from the available battery capacity detection section 14. By controlling the amount of current supplied to the inverter 1A, and controlling the motor/generator 1B as a motor or as a generator, the vehicle controlling section 5 controls the charging and discharging of the battery pack 10.

Each block voltage detection section 2 subjects the block voltage of each block 10A to an A/D (analog to digital) conversion. The unusual heating detection section 4 detects unusual heating of one or more cells 10B based on the internal resistance of each block 10A and the predetermined threshold value. The battery temperature detection section 6 measures the temperature of the battery pack 10 by means of a thermistor, subjects the measured battery temperature to an A/D conversion, and outputs the converted battery temperature value to the unusual heating detection section 4.

The threshold value which is set by the threshold value setting section 4B can be determined depending on whether the material composing the cells 10B or any material which the cells 10B are in contact with are suited for a given temperature of the battery pack 10. In particular, the threshold value can be set so that any given component element of each cell 10B will be maintained at or below a point of inflection on its characteristic curve, whereby the cell 10B having an elevated IR (internal resistance) value will be prevented from deteriorating acceleratively. As a result, the longevity of the battery pack 10 can be improved.

Alternatively, the threshold which is to be set by the threshold value setting section 4B can be calculated based on a sum of the heat emission (which is a sum of the heat of reaction and Joule's heat) from a single cell (i.e., a cell 10B) having an elevated IR value, a thermal capacity of the cell 10B, and the amount of heat which is diffused into the surrounding environment. The threshold value which is to be set by the threshold value setting section 4B can be empirically obtained based on an arbitrary cell which is designed so as to provide a relatively large IR value. Once the threshold value is determined, the determined threshold value is reflected in an IR determination threshold value map or an output restriction map.

The variance unusual heating detection section 4D detects unusual heating of one or more cells 10B based on whether or not at least one of the block voltages is equal to or greater than a predetermined value at the time of charging, or based on whether or not at least one of the block voltages is equal to or smaller than a predetermined value at the time of discharging. The vehicle controlling section 5 controls the battery power input/output section 1 based on the result of unusual heating detection by the variance unusual heating detection section 4D.

The following is a list of possible causes for unusual heating of a small number (including one) of cells 10B, as opposed to the unusual heating of the entire battery pack 10:

1) Internal short circuiting of cell 10B: Internal short circuiting of a cell 10B occurs when the electrodes within the cell 10B are short circuited to each other. Therefore, even if internal short circuiting of a cell 10B is externally detected and the input/output is shut down, aggravation of internal short circuiting cannot be prevented.

2) Overcharging of cell 10B: Overcharging of a cell 10B occurs when there is a very large variation in the degree of self-discharging of a number of cells 10B. However, in general, it is very rarely the case that only one of the cells of a battery pack has a good charging efficiency. Usually, overcharging of a block 10A is detectable based on the I-V (current-voltage) characteristics of the entire battery pack 10 at the time of charging.

3) Joule heating of a cell lacking in electrolyte, which may result from overdischarging or overcharging of a cell 10B or breakage of the cell body.

4) Joule heating of a cell which has deteriorated due to decreased activity of electrode plates from long periods of use or non-use, and a decrease in the amount of electrolyte within a separator between positive and negative electrodes of a battery.

Among the above, conditions 3) and 4) can be detected by a conventional unusual heating detection section which requires a temperature sensor to be mounted on each one of a plurality of cells, and can be prevented from being aggravated by shutting down the input to or output from the battery.

As for conditions 3) and 4), alternative functions can be realized by detecting an increase in the IR value of a cell 10B.

The internal resistance calculation section 4A calculates the IR (gradient) of each block 10A by a least squares method, based on the I-V characteristics of the battery current and the block voltage of each block 10A during the travel of the vehicle. The threshold value setting section 4B sets a threshold value based on the temperature of the battery pack 10 as detected by the temperature detection section 6.

If the IR of each block 10A as calculated by the internal resistance calculation section 4A becomes equal to or greater than the threshold value set by the threshold value setting section 4B, then the unusual heating detection section 4 outputs a signal for restricting input to or output from the battery pack 10 to the vehicle controlling section 5.

Figure 2:
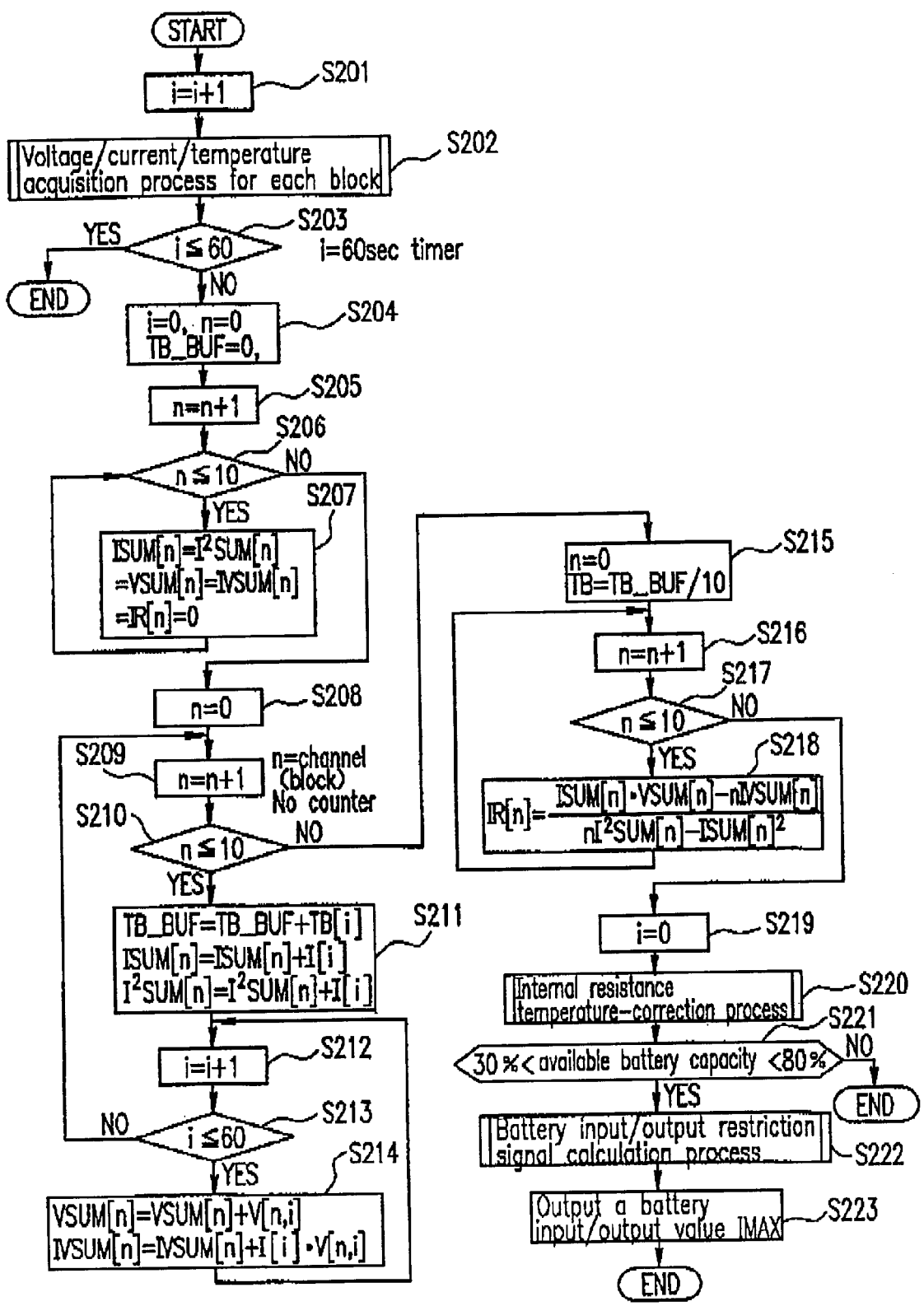
FIG. 2 is a flowchart illustrating the procedure of controlling a battery pack 10 according to Example 1 of the present invention.
Figure 3:
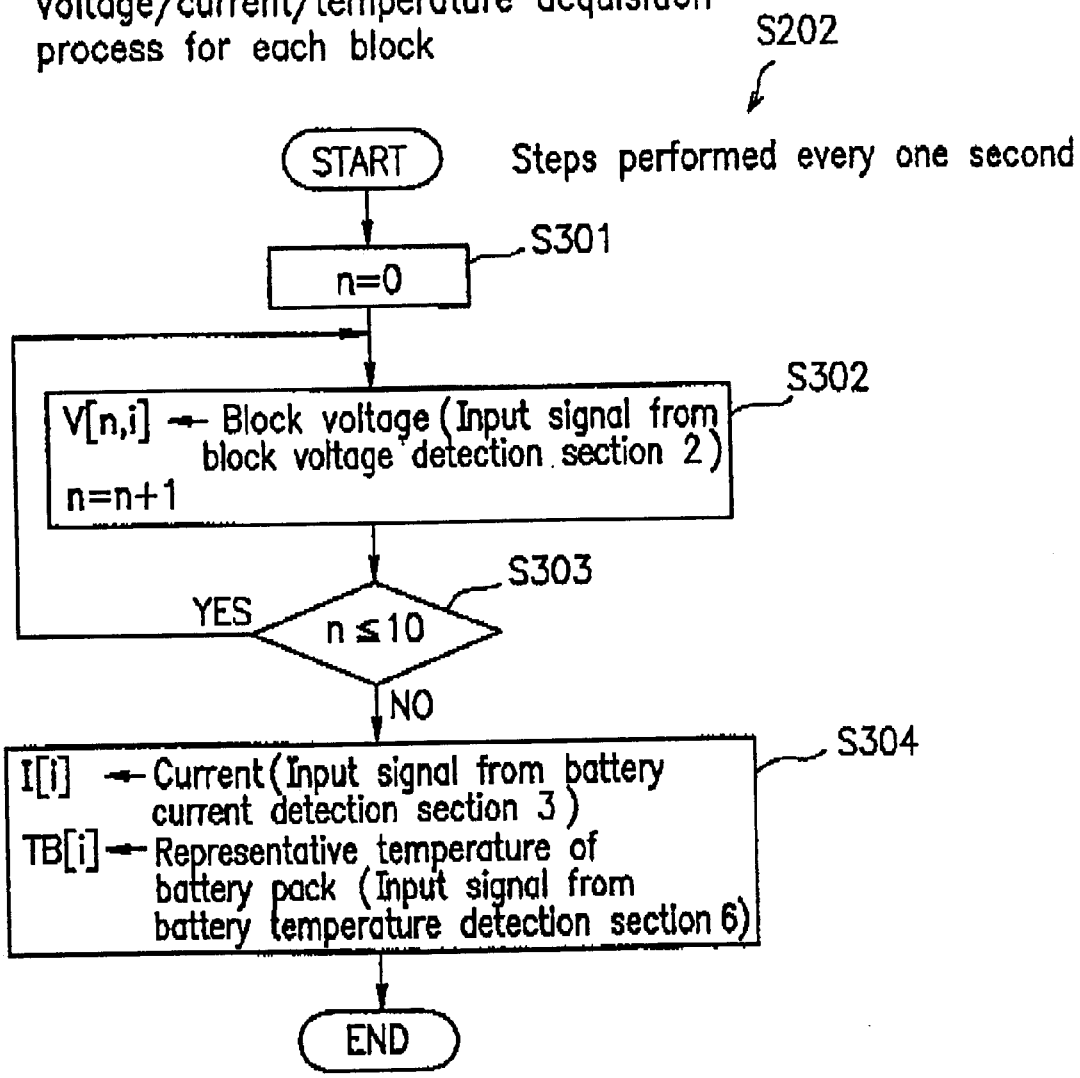
FIG. 3 is a flowchart illustrating the procedure of obtaining the voltage, current, and temperature of each block during the control of the battery pack 10 according to Example 1 of the present invention.
Figure 4:
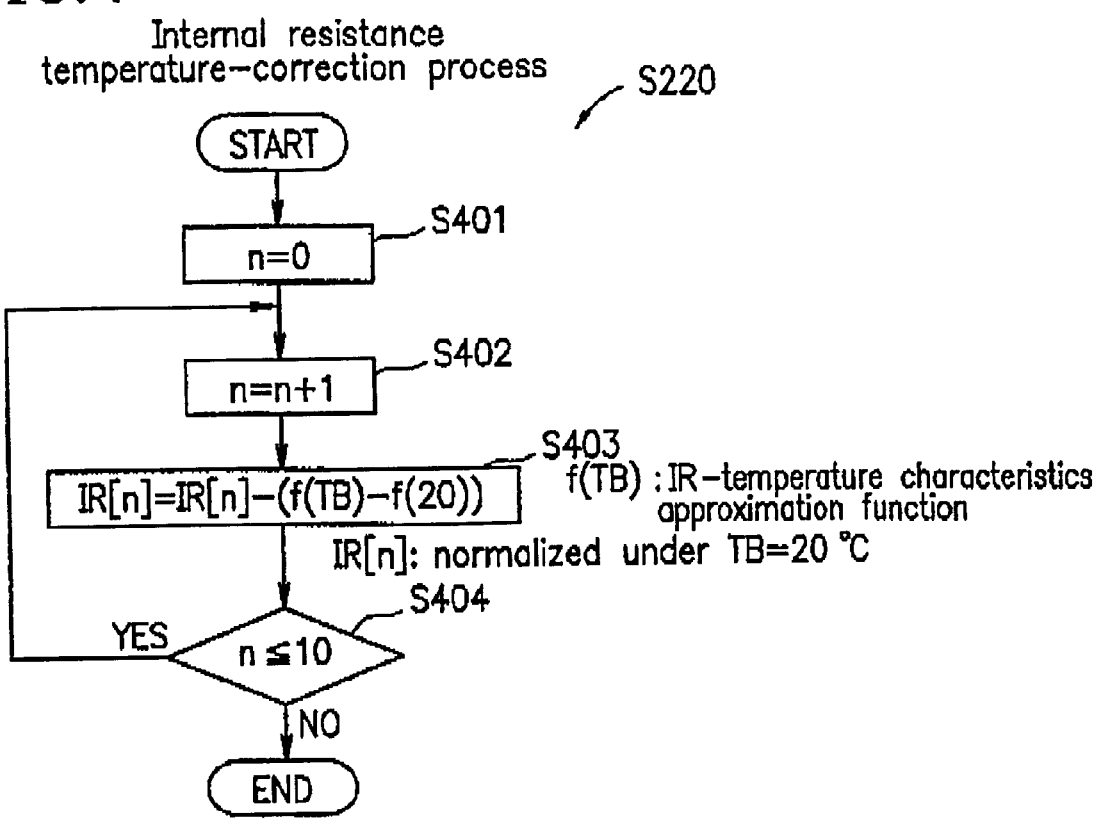
FIG. 4 is a flowchart illustrating the procedure of an internal resistance temperature-correction process during the control of the battery pack 10 according to Example 1 of the present invention.
Figure 5:
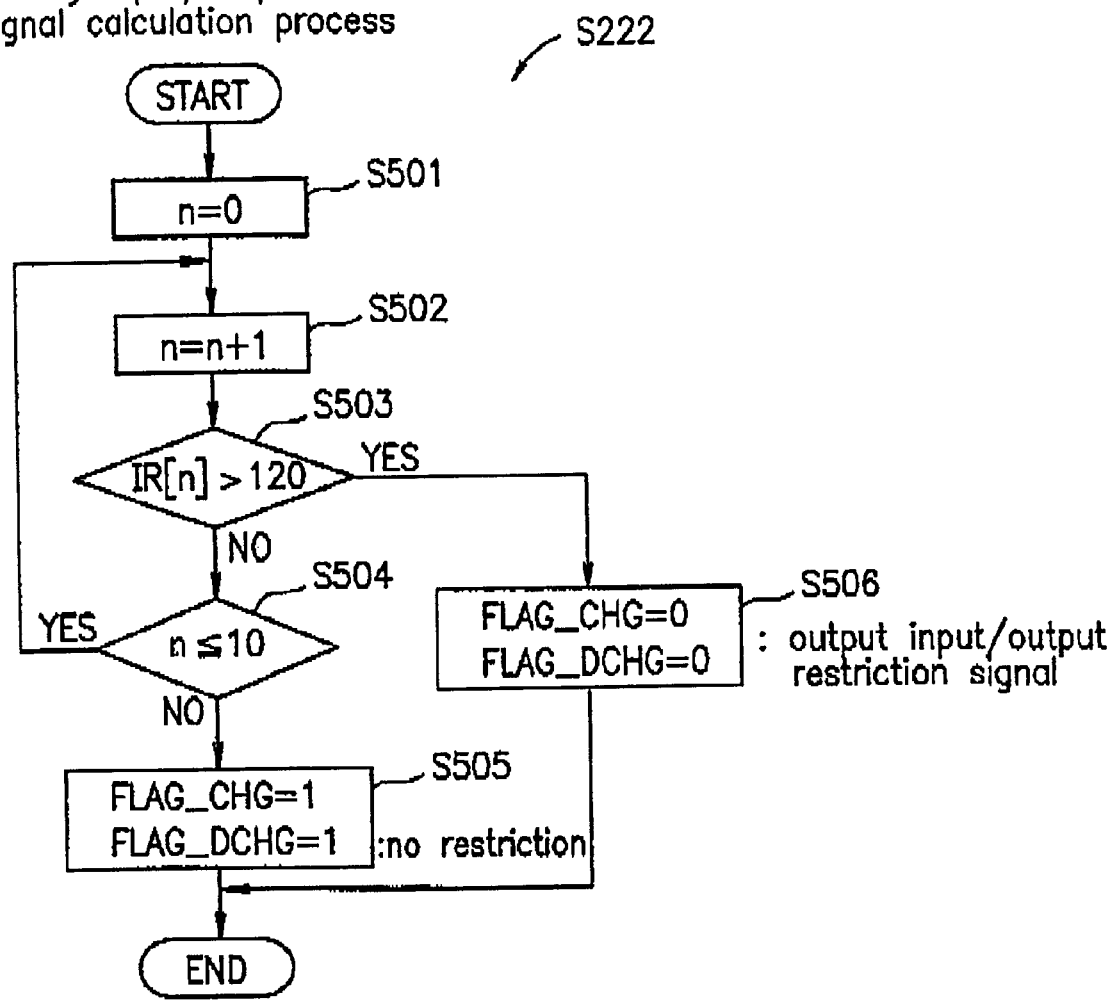
FIG. 5 is flowchart illustrating the procedure of a battery input/output restriction signal calculation process during the control of the battery pack 10 according to Example 1 of the present invention.
Figure 6:
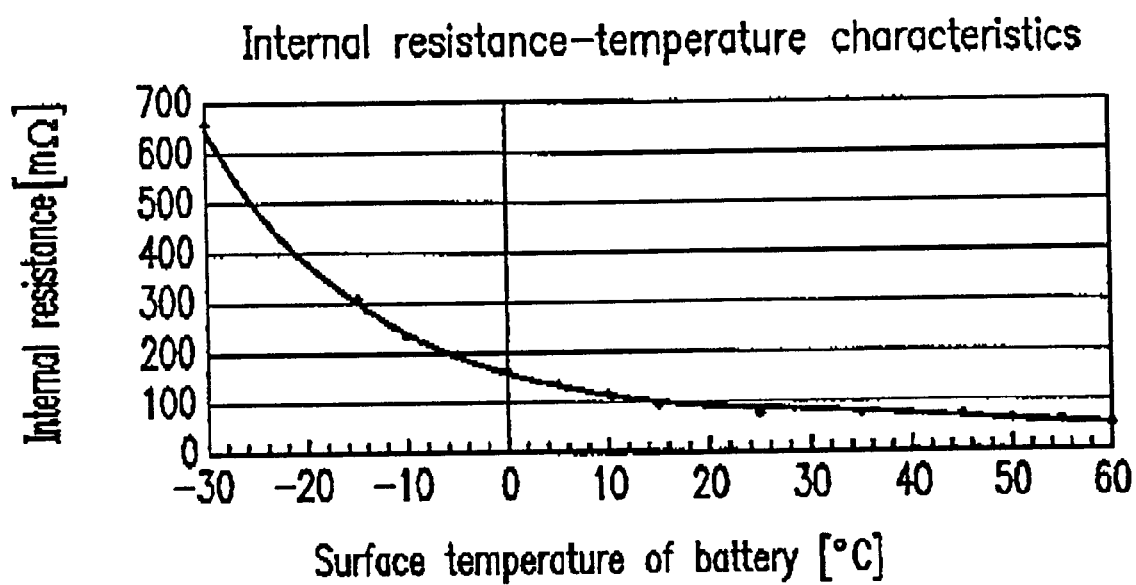
FIG. 6 is a graph illustrating a relationship between the internal resistance and the surface temperature of a battery according to Example 1 of the present invention.

A procedure of controlling the battery pack 10 according to Example 1 of the present invention will be described with reference to FIGS. 2 to 6. FIG. 2 is a flowchart illustrating the procedure of controlling the battery pack 10 according to Example 1 of the present invention, in which a number of steps which are performed every one second are shown. FIG. 3 is a flowchart illustrating the procedure of obtaining the voltage, current, and temperature of each block during the control of the battery pack 10. FIG. 4 is a flowchart illustrating the procedure of an internal resistance temperature-correction process. FIG. 5 is a flowchart illustrating the procedure of a battery input/output restriction signal calculation process. FIG. 6 is a graph illustrating a relationship between the internal resistance and the surface temperature of a battery.

A variable TB_BUF represents a TB value input/output buffer. A variable ISUM[n] represents a sum of the currents of n blocks during a period of 60 seconds. A variable $I^2$SUM[n] represents a sum of squares of the currents on the n blocks during the period of 60 seconds. A variable TB[i] represents a representative temperature of the battery pack 10 at i seconds as counted from the start of the procedure (where i is an integer from 1 to 60). The representative temperature of the battery pack 10 is acquired by the battery temperature detection section 6 as shown in FIGS. 1 and 3. A variable VSUM[n] represents a sum of block voltages during the period of 60 seconds. A variable V[n,i] represents a block voltage of the n blocks at i seconds as counted from the start of the procedure (where n is an integer from 1 to 10 and; i is an integer from 1 to 60). A variable IVSUM[n] represents a sum of multiplication products between the currents and voltages of the n blocks during the period of 60 seconds.

After a timer variable i is updated (S201), the block voltage detection section 2 associated with each block 10A detects the voltage of that block 10A; the battery current detection section 3 detects the current flowing in the battery pack 10; and the battery temperature detection section 6 detects the temperature of the battery pack 10 (S202).

If the timer variable i is below 60, the procedure is terminated (following the YES path from S203). If the timer variable i is equal to or greater than 60 (following the NO path from S203), then "0" is substituted for the timer variable i, a block number counter n, and the variable TB_BUF (S204).

Then, the block number counter n is updated (S205). If the updated value of the block number counter n is equal to or smaller than 10 (following the YES path from S206), then "0" is substituted for the variable ISUM[n], the variable $I^2$SUM[n], the variable VSUM[n], the variable IVSUM[n], and the internal resistance IR[n] (S207).

After the block number counter n is cleared to zero (S208), the block number counter n is updated (S209). If the updated block number counter n is equal to or smaller than 10 (following the YES path from S210), then the variable TB[i] is added to the variable TB_BUF; the variable I[i] is added to the variable ISUM[n]; and the variable I[i] is added to the variable $I^2$SUM[n] (S211).

The timer variable i is updated (S212), and it is determined whether or not the timer variable i is equal to or smaller than 60 (S213). If the timer variable i is not equal to or smaller than 60, the control returns to S209.

If the timer variable i is equal to or smaller than 60, then the variable V[n,i] is added to the variable VSUM[n]; (variable I[i]·variable V[n,i]) is added to the variable IVSUM[n] (S214); and the control returns to S212.

If the updated block number counter n is not equal to or smaller than 10 (following the NO path from S210), then "0" is substituted for the block number counter n, and (variable TB_BUF)/10 is substituted for the variable TB (S215).

Then, the block number counter n is updated (S216). If the updated block number counter n is equal to or smaller than 10 (following the YES path from S217), then the internal resistance IR[n] is calculated based on the variable ISUM, the variable VSUM, the variable IVSUM, and the variable $I^2$SUM (S218). Thereafter, the control returns to S216.

If the updated block number counter n is not equal to or smaller than 10 (following the NO path from S217), the timer variable i is cleared to zero (S219), and an internal resistance temperature-correction process (described later) is performed (S220).

If the available battery capacity is not greater than 30% and not smaller than 80% (following the NO path from S221), the procedure is terminated. If the available battery capacity is greater than 30% and is smaller than 80% (following the YES path from S221), a battery input/output restriction signal calculation process is performed (S222). The unusual heating detection section 4 outputs a battery input/output value IMAX to the vehicle controlling section 5 (S223), and the procedure is terminated.

With reference to FIG. 3, the voltage/current/temperature acquisition process performed for each block (S202) will be described in more detail. First, the block number counter n is cleared to zero (S301). A block voltage detected by one of the block voltage detection sections 2 is substituted for the variable V[n,i], and the block number counter n is updated (S302). If the block number counter n is equal to or smaller than 10 (following the YES path from S303), then S302 is repeated.

If the block number counter n is not equal to or smaller than 10 (following the NO path from S303), then a current value of the battery pack 10 detected by the battery current detection section 3 is substituted for the variable I[i]; the representative temperature of the battery pack 10 detected by the battery temperature detection section 6 is substituted for the variable TB[I] (S304); and the voltage/current/temperature acquisition process for the respective blocks is terminated.

With reference to FIGS. 4 and 6, the internal resistance temperature-correction process (S220) will be described in more detail. First, the block number counter n is cleared to zero (S401). After updating the block number counter n (S402), the internal resistance IR[n] is corrected based on an internal resistance-temperature characteristics approximation function f(TB) and f(20) (S403).

The internal resistance is corrected by employing the internal resistance-temperature characteristics approximation function f(TB) because, as shown in FIG. 6, the internal resistance varies depending on the battery temperature. If the block number counter n is equal to or smaller than 10 (following the YES path from S404), then the control returns to S402. If the block number counter n is not equal to or smaller than 10 (following the NO path from S404), then the internal resistance temperature-correction process is terminated.

With reference to FIG. 5, the battery input/output restriction signal calculation process (S217) will be described in more detail. The block number counter n is cleared to zero (S501). After the block number counter n is updated (S502), if the internal resistance IR[n] is not greater than 120 (following the NO path from S503), it is determined whether or not the block number counter n is equal to or smaller than 10 (S504).

If the block number counter n is equal to or smaller than 10, (following the YES path from S504), the control returns to S502. If the block number counter n is not equal to or smaller than 10 (following the NO path from S504), "1" is substituted for a variable FLAG_CHG and a variable FLAG_DCHG to indicate that no battery input/output restriction signal is output (S505), and the battery input/output restriction signal calculation process is terminated.

If the internal resistance IR[n] is greater than 120 (following the YES path from S503), "0" is substituted for the variable FLAG_CHG and the variable FLAG_DCHG to indicate that a battery input/output restriction signal is output (S506), and the battery input/output restriction signal calculation process is terminated.

Figure 7:
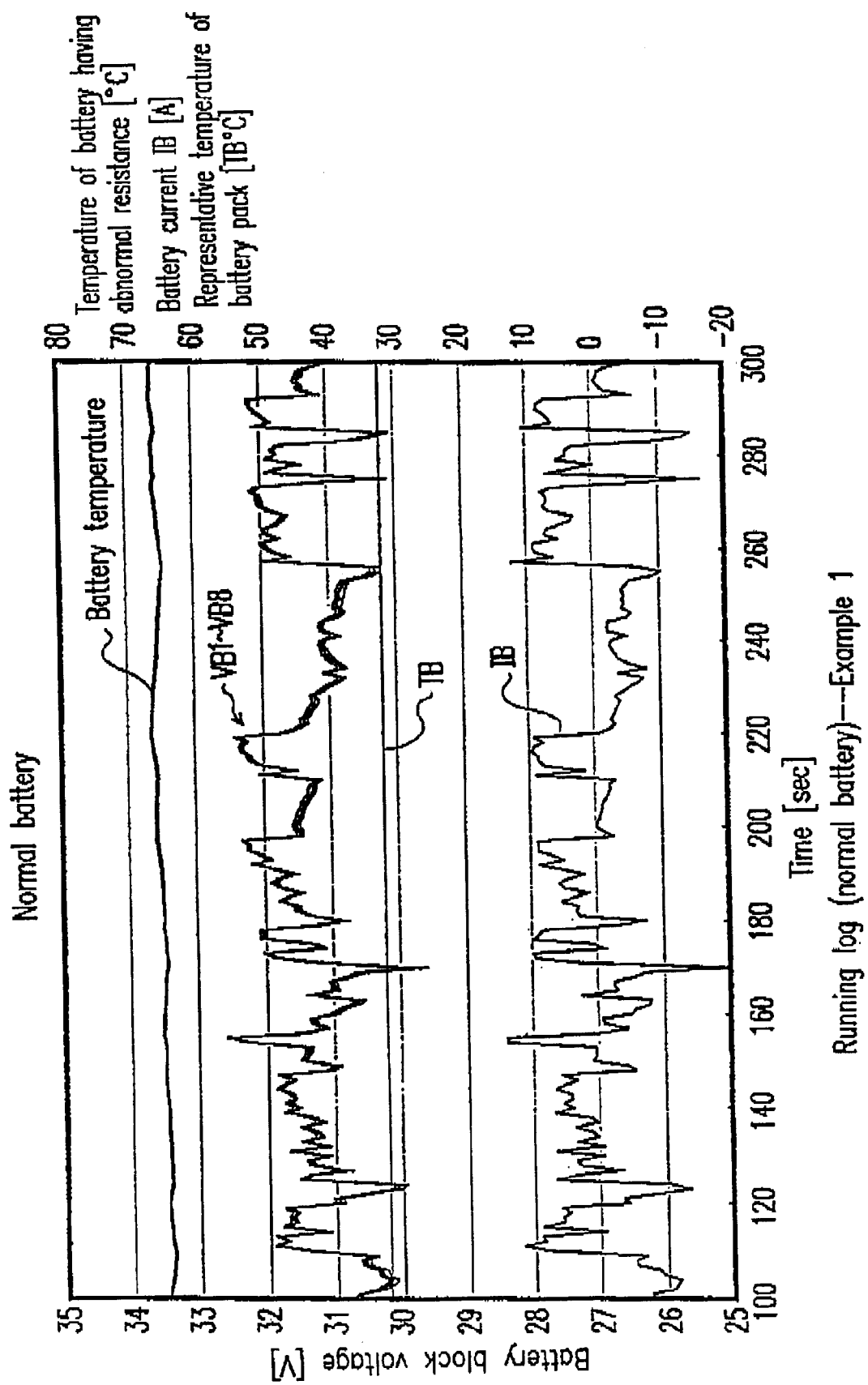
FIG. 7 is a graph showing an exemplary running log of the battery block voltages of a normal battery pack according to Example 1 of the present invention.
Figure 8:
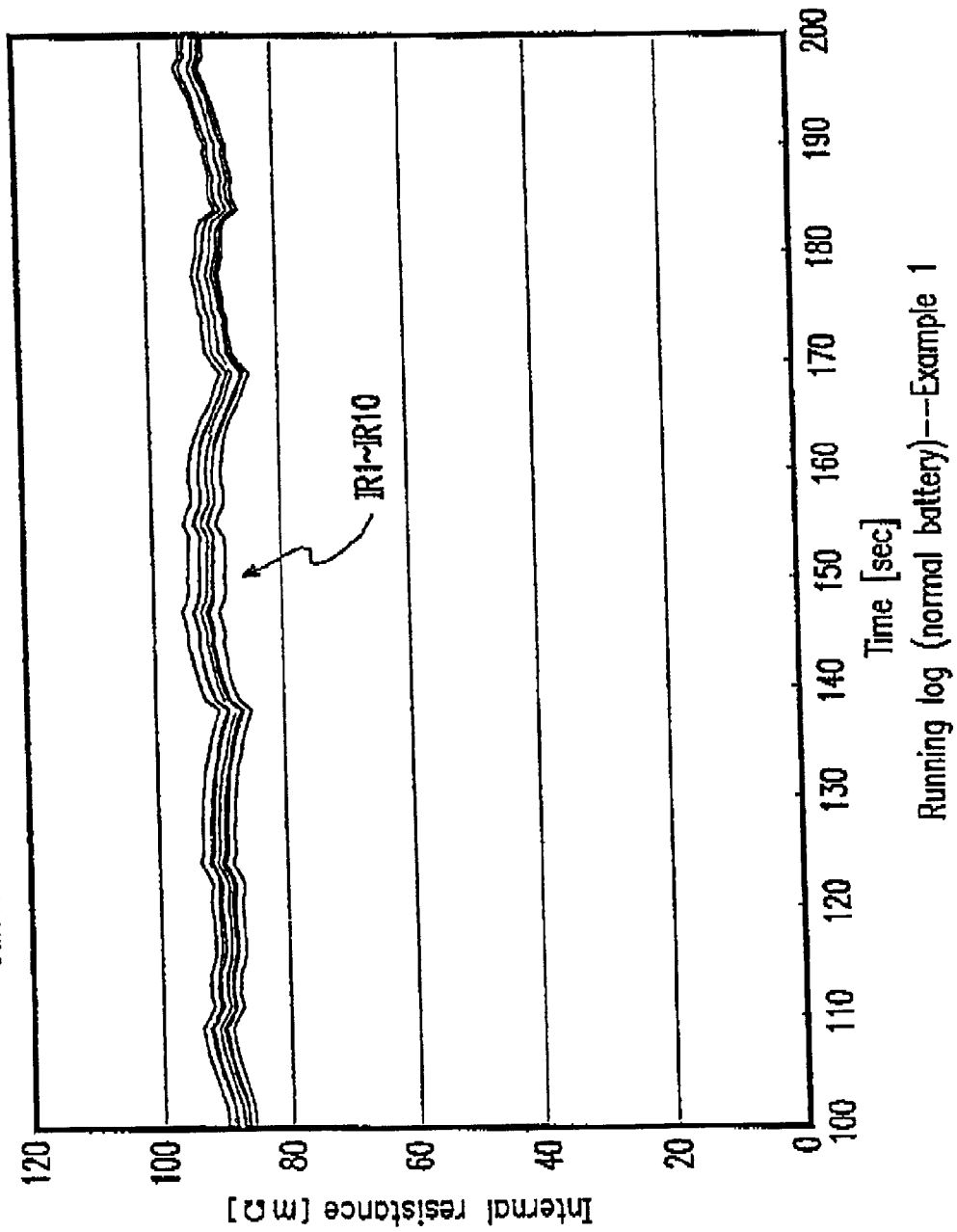
FIG. 8 is a graph showing an exemplary running log of the internal resistances of a normal battery pack according to Example 1 of the present invention.
Figure 9:
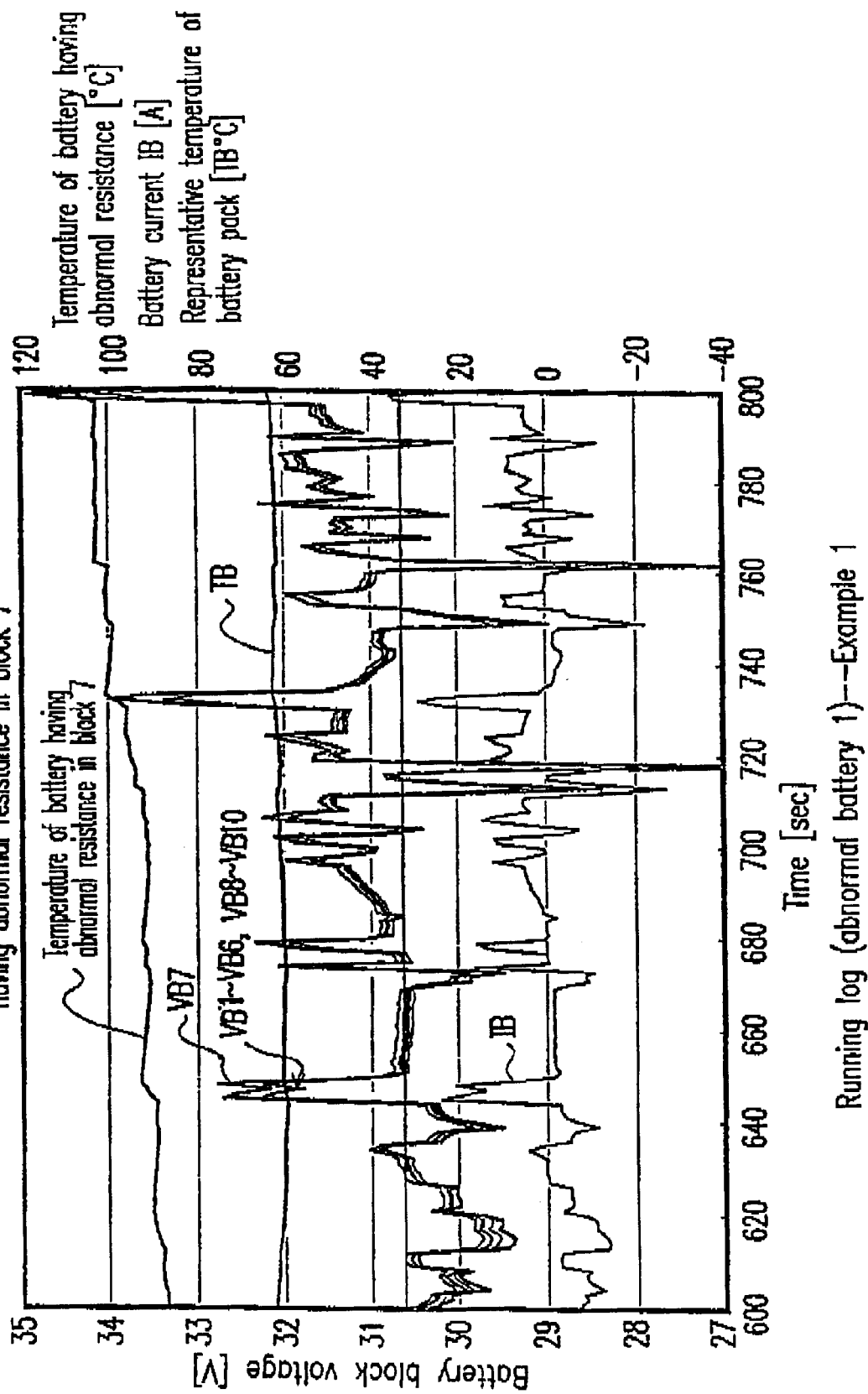
FIG. 9 is a graph showing an exemplary running log of the battery block voltages of a battery pack which includes a cell having abnormal resistance according to Example 1 of the present invention.
Figure 10:
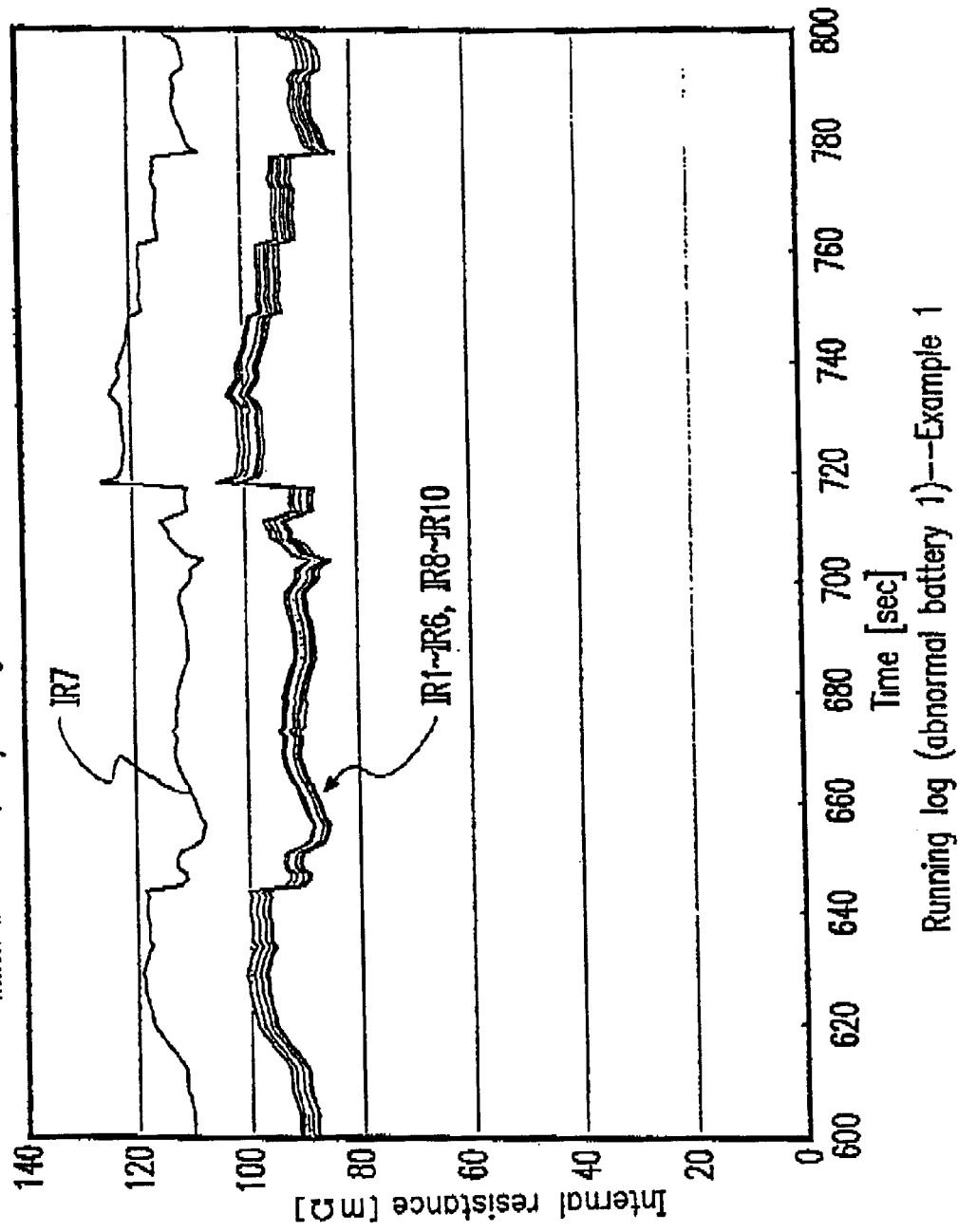
FIG. 10 is a graph showing an exemplary running log of the internal resistance of a battery pack which includes a cell having abnormal resistance according to Example 1 of the present invention.

FIG. 7 is a graph showing an exemplary running log of the battery block voltages of a normal (i.e., normally operating) battery pack according to Example 1 of the present invention. FIG. 8 is a graph showing an exemplary running log of the internal resistance of a normal battery pack. FIG. 9 is a graph showing an exemplary running log of the battery block voltages of a battery pack which includes a cell having abnormal resistance according to Example 1 of the present invention. FIG. 10 is a graph showing an exemplary running log of the internal resistances of a battery pack which includes a battery having abnormal resistance.

With reference to FIGS. 7 and 9, in the case of a normal battery pack, block voltages VB1 to VB8 associated with eight respective blocks 10A are substantially the same, as shown in FIG. 7. On the other hand, in the case of a normal battery pack including a battery having abnormal resistance, as shown in FIG. 9, the block voltage VB7 associated with a block including the cell having abnormal resistance (e.g., block 7 in the example illustrated in FIG. 9) has a different value from those of the block voltages VB1 to VB6 and VB8 to VB10 associated with blocks not including any batteries having abnormal resistance (e.g. blocks 1 to 6 and blocks 8 to 10 in the example illustrated in FIG. 9).

With reference to FIGS. 8 and 10, the internal resistances of the respective blocks of a normal battery pack and those of a battery pack including a battery having abnormal resistance will now be described. In the case of a normal battery pack 10, the internal resistances IR1 to IR10 associated with the respective blocks 10A are substantially the same, as shown in FIG. 8. On the other hand, in the case of a normal battery pack including a battery having abnormal resistance, as shown in FIG. 10, the internal resistance IR7 associated with a block including a battery having abnormal resistance (e.g., block 7 in the example illustrated in FIG. 10) has a different value from those of the internal resistances (IR1 to IR6 and IR8 to IR10 associated with blocks not including any batteries having abnormal resistance (e.g. blocks 1 to 6 and blocks 8 to 10) in the example illustrated in FIG. 10).

Figure 11:
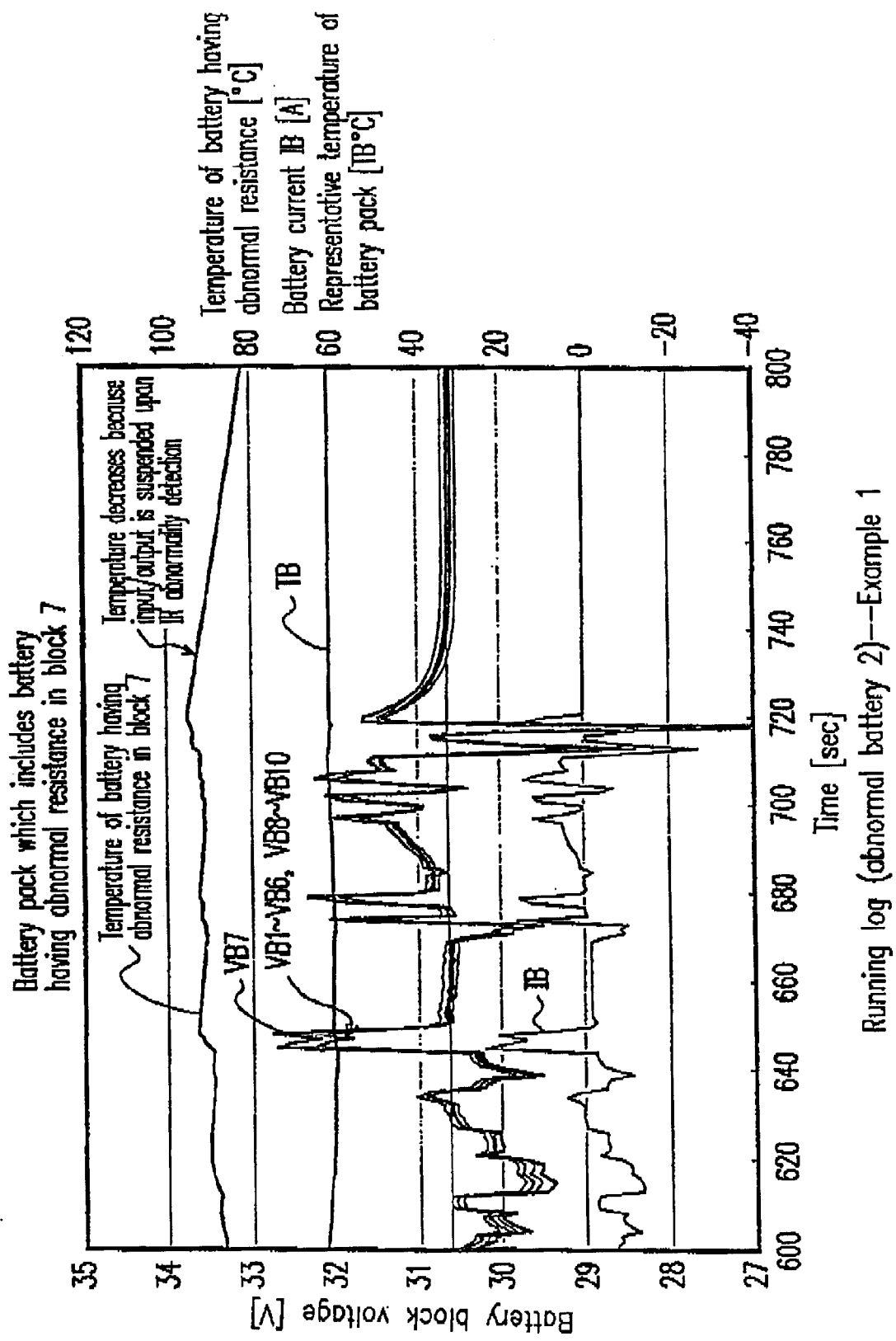
FIG. 11 is a graph showing another exemplary running log of the battery block voltages of a battery pack which includes a cell having abnormal resistance according to Example 1 of the present invention.

FIG. 11 is a graph showing another exemplary running log of the battery block voltages of a battery pack including a battery having abnormal resistance. As in the case of the running log shown in FIG. 9, the block voltage VB7 associated with a block including a battery having abnormal resistance (e.g., block 7 in the example illustrated in FIG. 11) has a different value from those of the block voltages VB1 to VB6 and VB8 to VB10 associated with blocks not including any batteries having abnormal resistance (e.g. blocks 1 to 6 and blocks 8 to 10 in the example illustrated in FIG. 11).

Thus, according to Example 1, the unusual heating detection section 4 detects unusual heating of one or more cells 10B based on the respective internal resistances of a plurality of blocks 10A and a threshold value, and the vehicle controlling section 5 controls the battery power input/output section 1 based on the results of unusual heating detection by the unusual heating detection section 4. Therefore, there is no need to mount a temperature sensor on each one of a plurality of cells 10B, so that it is possible to control the battery pack 10 in an economical manner.

EXAMPLE 2

Example 2 of the present invention differs from Example 1 in that the input to or output from the battery pack 10 is controlled or restricted in a stepwise manner. The vehicle controlling section 5 controls the battery power input/output section 1 in a stepwise manner based on the results of unusual heating detection by the unusual heating detection section 4.

Figure 12:
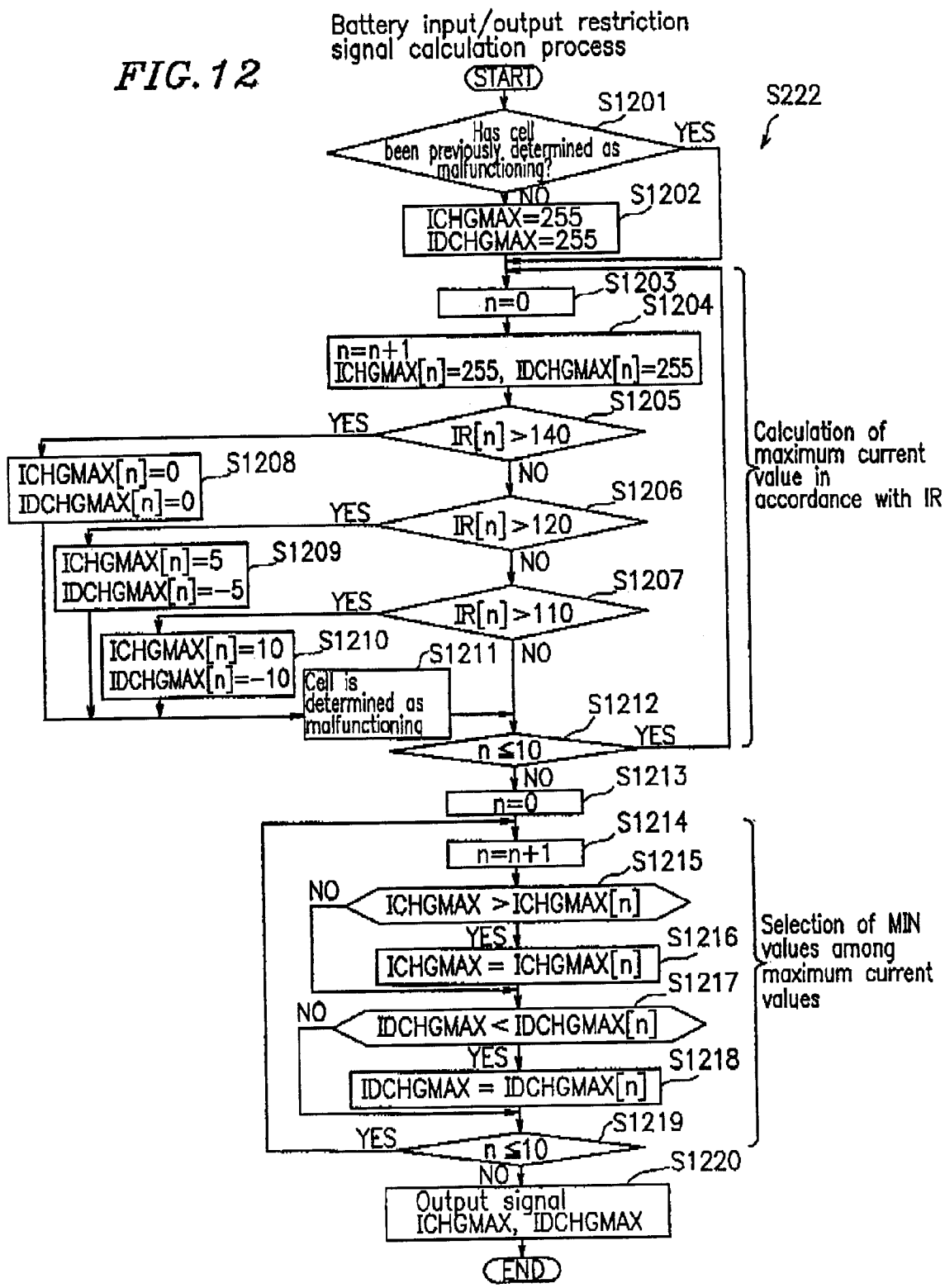
FIG. 12 is a flowchart illustrating the procedure of a battery input/output restriction signal calculation process during the control of a battery pack 10 according to Example 2 of the present invention.

FIG. 12 is a flowchart illustrating the procedure of a battery input/output restriction signal calculation process during the control of a battery pack 10 according to Example 2 of the present invention. The procedure of controlling the battery pack 10 according to Example 2 is identical with that described in Example 1 with reference to FIGS. 2 to 5 except for the battery input/output restriction signal calculation process. The processes other than the battery input/output restriction signal calculation process, which are identical with their counterparts in Example 1, will not be described herein.

Referring to FIG. 12, maximum current values in accordance with the internal resistance (IR) is calculated by the processes from steps S1203 to S1212. A minimum value MIN among maximum current values ICHGMAX[1] to ICHGMAX[n] and a minimum value MIN among maximum current values IDCHGMAX[1] to IDCHGMAX[n] are selected by the processes from steps S1203 to S1212.

It is determined whether or not a cell has previously been determined as malfunctioning (S1201). If it is determined that the cell has not previously been determined as malfunctioning (following the NO path from S1201), then "255" is substituted for a variable ICHGMAX and a variable IDCHGMAX (S1202).

If it is determined that the cell has previously been determined as malfunctioning (following the YES path from S1201), or if "255" has been substituted for the variable ICHGMAX and the variable IDCHGMAX (S1202), then the block number counter n in cleared to zero (S1203).

After the block number counter n is updated, "255" is substituted for the variable ICHGMAX and the variable IDCHGMAX (S1204). It is determined whether or not the internal resistance IR[n] is greater than 140 (S1203). If the internal resistance IR[n] is greater than 140, then the variable ICHGMAX[n] and the variable IDCHGMAX[n] are cleared to zero (S1208).

If the internal resistance IR[n] is equal to or smaller than 140, then it is determined whether or not the internal resistance IR[n] is greater than 120 (S1206). If the internal resistance IR[n] is greater than 120, then "5" is substituted for the variable ICHGMAX[n] and "−5" is substituted for the variable IDCHGMAX[n] (S1209).

If the internal resistance IR[n] is equal to or smaller than 120, then it is determined whether or not the internal resistance IR[n] is greater than 110 (S1207). If the internal resistance IR[n] is greater than 110, then "10" is substituted for the variable ICHGMAX[n] and "−10" is substituted for the variable IDCHGMAX[n] (S1210).

If the variable ICHGMAX[n] and the variable IDCHGMAX[n] have been cleared to zero (S1208), or if "5" has been substituted for the variable ICHGMAX[n ] and "−5" has been substituted for the variable IDCHGMAX[n] (S1209), or if "10" has been substituted for the variable ICHGMAX[n] and "−10" has been substituted for the variable IDCHGMAX[n] (S1210), then the cell is determined as malfunctioning (S1211).

It the cell is determined as malfunctioning (S1211), or if the internal resistance IR[n] is equal to or smaller than 110 (following the NO path from S1207), then it is determined whether or not the block number counter n is equal to or smaller than 10 (S1212).

If the block number counter h is equal to or smaller than 10, the control returns to S1203. If the block number counter n, in not equal to or smaller than 10, then the block number counter n in cleared to zero (S1213).

After the block number counter n is updated (S1214), it is determined whether or not the variable ICHGMAX is greater than the variable ICHGMAX[n] (S1215). If the variable ICHGMAX is greater than the variable ICHCMAX [n], then the variable ICHGMAX[n] is substituted for the variable ICHGMAX (S1216).

If the variable ICHGMAX is not greater than the variable ICHGMAX[n], or if the variable ICHGMAX [n] has been substituted for the variable ICHGMAX, then it is determined whether or not the variable IDCHGMAX is smaller than the variable IDCHGMAX[n] (S1217). If the variable IDCHGMAX is smaller than the variable IDCHGMAX[n], then the variable IDCHGMAX[n] is substituted for the variable IDCHGMAX (S121B).

If the variable IDCHGMAX is not smaller than the variable IDCHGMAX[n], or if the variable IDCHGMAX[n] has been substituted, for the variable IDCHGMAX, then it is determined whether or not the block number counter n is equal to or smaller than 10 (S1219).

If the block number counter n is equal to or smaller then 10, then the control returns to S1214. If the block number counter n is not equal to or smaller than 10, then a signal is output based on the variables ICHGMAX and IDCHGMAX (S1220), and the battery input/output restriction signal calculation process in terminated.

According to Example 2, it in possible to restrict a charge or discharge current in a stepwise manner, in accordance with this increase in IR. Therefore, the following effects can be obtained in addition to merely preventing the unusual heating of the cells 10B:

1) Even if the IR of a cell 10B rises to an unusual level, the cell 10B can be controlled so that the temperature of the cell 10B is limited to or below a temperature which is suitable for the elements within the cell 10B. By detecting the unusual rising of the IR of the calla 10B so an to restrict the input to or output from the cells 10B, it is possible to use the battery pack 10 at or below a temperature over which the performance of the cell 10B would deteriorate acceleratively due to the denaturing of the active material in the cell 10B, whereby the longevity of the battery pack 10 can be improved.

By ensuring that the battery pack 10 is used at or below a softening temperature of the separator between positive and negative electrodes in each cell 10B, the possibilities of internal short-circuiting between the positive and negative electrodes of the cells 10B can be reduced.

2) By detecting the unusual rising of the IR of the cells 10B so as to restrict the input to or output from the cells 10B, it is possible to continuously use the battery pack 10 while preventing the cell 10B from reaching an abnormal temperature.

A conventional unusual heating detection apparatus can only detect an abnormality when a cell(s) 10B reaches a predetermined level of a high temperature. Therefore, in applications such as batteries for a hybrid vehicle, for example, it may be necessary to immediately shut down the battery pack 10 upon detection of an abnormality because the battery pack 10 should provide proper motive force for the vehicle.

According to Example 2 of the present invention, while it is not possible ie to directly measure an increase in the temperature of a cell 10B, such an increase in the temperature of a cell 10B can be inferred based on the IR value of that cell 10B, and the input to or output from the battery pack 10 can be accordingly restricted in a stepwise manner. This allows the battery pack 10 to be continuously used over prolonged periods of time.

As shown in FIG. 6, the IR of a nickel-metal hydride battery or the like tends to be lowered as the battery temperature increases, and this tendency is also common to batteries having an elevated IR value due to malfunctioning. This complicates the determination as to the soundness of the battery, because even if the IR value of such a cell decreases after the vehicle has traveled for some time, such a decrease may be due to an increased temperature of the cell. According to the present example, it is ensured after the start of the procedure shown in FIG. 12 that any cell that has previously been determined as malfunctioning will not have its input/output conditions restored, thereby precluding misdetections.

EXAMPLE 3

Example 3 of the present invention differs from Example 1 in that the variance calculation section 4C calculates an average value and a variance $\sigma^2$ of the block voltages of a plurality of blacks 10A, and that the variance unusual heating detection section 4D detects unusual heating of one or more cells 10B based on the average value and the variance $\sigma^2$ of the block voltages of the plurality of blocks 10A.

According to Example 3, the variation of the block voltages of the blocks 10A is subjected to statistical processing, and any block 10A that substantially falls outside the range of the others are determined as malfunctioning, whereupon the input to or output from the battery pack 10 will be restricted.

The variance unusual heating detection section 4D outputs a signal for restricting the input to or output from the battery pack 10 to the vehicle controlling section 5 if at least one or the block voltages of the blocks 10A is equal to or greater than ±2.5 σ² at the time of charging, or equal to or smaller than −2.5 σ² at the time of discharging.

According to Example 3, malfunctioning batteries are determined based on the fact that the cells 10B must in theory be of equal characteristics. This technique has an advantage over the technique of applying a standardized threshold value, especially where such a threshold value must be determined by considering complex factors such as the battery temperature, available battery capacity, battery deterioration, and fluctuation in the IR values at low temperatures, which would require a very large amount of data. Trying to address such various factors would increase the cost of experimentation required for obtaining battery characteristics data and the burden an a CPU that calculates the data.

Figure 13:
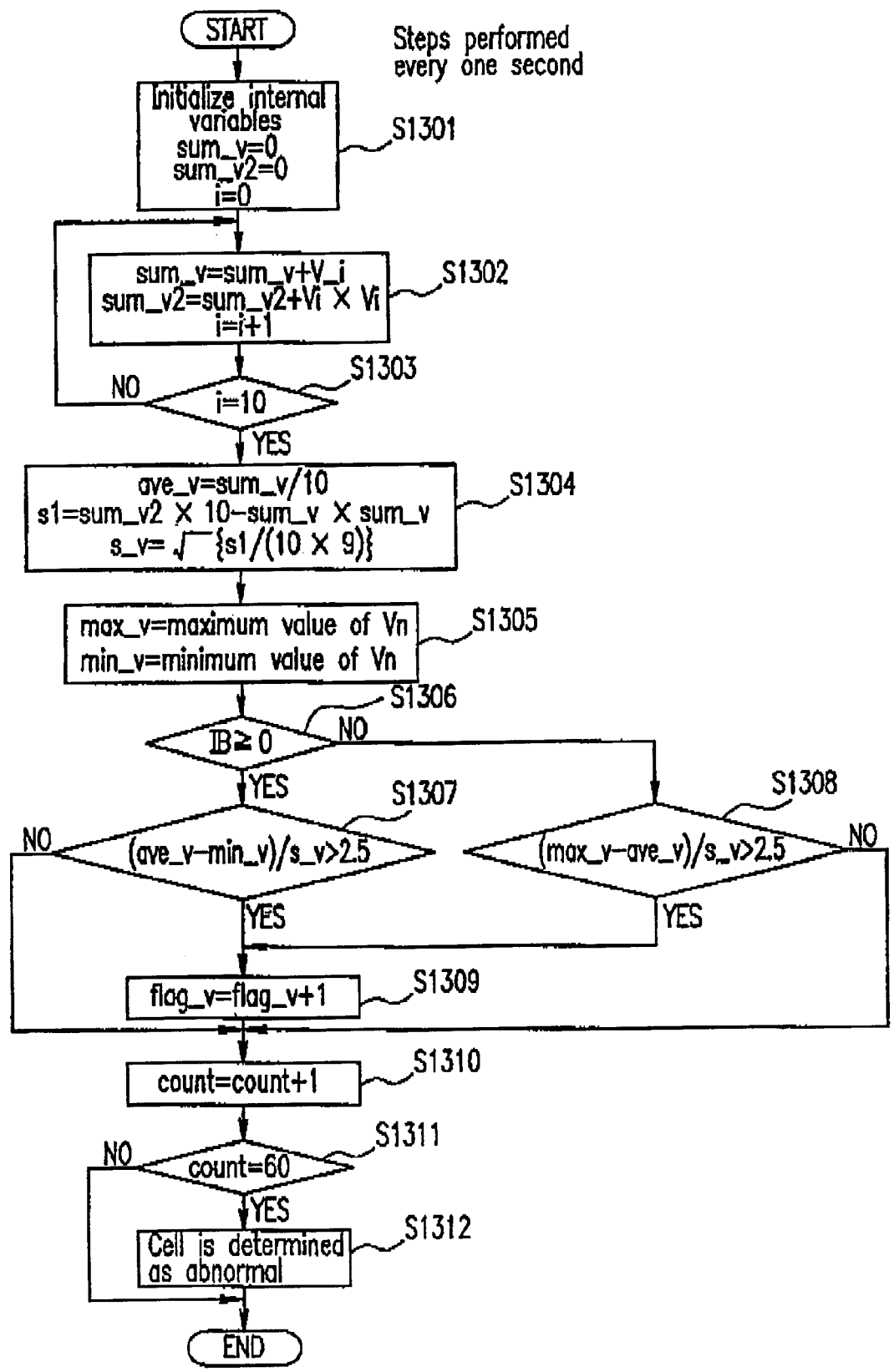
FIG. 13 is a flowchart illustrating the procedure of an unusual heating detection process during the control of a battery pack 10 according to Example 3 of the present invention.
Figure 14:
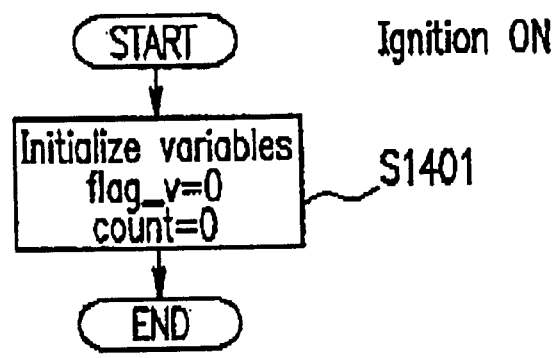
FIG. 14 is a flowchart illustrating the procedure of a variable initialization process during the control of the battery pack 10 according to Example 3 of the present invention.
Figure 15:
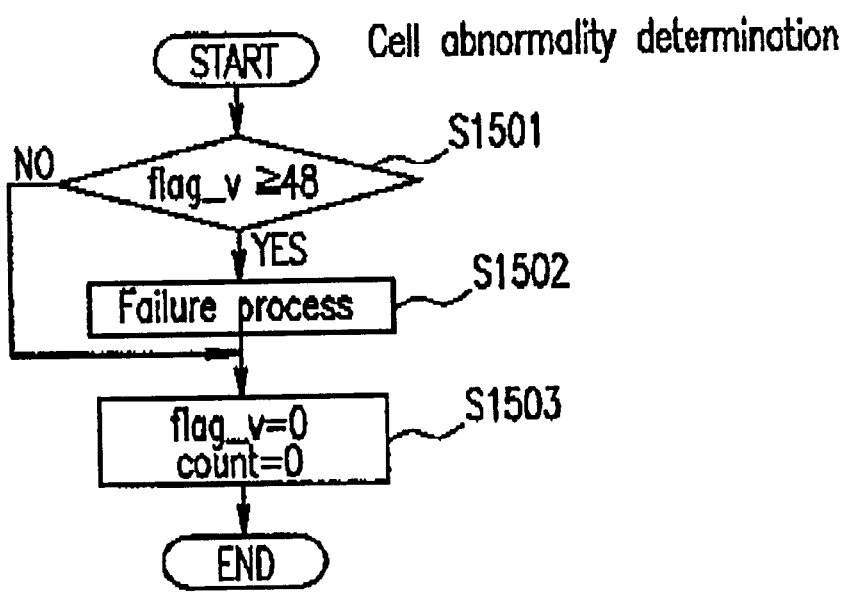
FIG. 15 is a flowchart illustrating the procedure of a cell abnormality determination process during the control of the battery pack 10 according to Example 3 of the present invention.

FIG. 13 is a flowchart illustrating the procedure of an unusual heating detection process during the control of a battery pack 10 according to Example 3 of the present invention. FIG. 14 is a flowchart illustrating the procedure of a variable initialization process during the control of the battery pack 10. FIG. 15 is a flowchart illustrating the procedure of a cell abnormality determination process.

Referring to FIG. 13, Internal variables sum_v and sum_v2, and a timer variable i are initialized (S1301). A variable V_i is added to the internal variable sum_v; (Vi×vi) is added to the internal variable sum_v2; and the timer variable i is updated (S1302). If the timer variable i is not equal to 10 (following the NO path from S1303), the process of S1302 is repeated.

If the timer variable i in equal to 10 (following the YES path from S1303), a value obtained by dividing the internal variable sum_v by ten is substituted for a variable ave_v; a value calculated as a function of the internal variable sum_v and the internal variable sum_v2 is substituted for a variable s1; and a value calculated as a function of the variable s1 is substituted for a variable s_v (S1304). A maximum value of a variable Vn is substituted for a variable max_v; and a minimum value of the variable Vn is substituted for a variable min_v (S1305).

It in determined whether or not a variable IB is equal to or greater than zero (B1306). If the variable IB is equal to or greater than zero, then it is determined whether or not a value which in obtained by dividing (ave_v−min_v) by the variable s_v is greater than 2.5 (S1307). If the variable IB is smaller than zero, then it is determined whether or not a value which is obtained by dividing (max_v−ave_v) by the variable s_v is greater than 2.5 (S1308).

If the value which is obtained by dividing (ave_v−min_v) by the variable s_v is greater than 2.5, or if the value which is obtained by dividing (max_v−(ave_v) by the variable s_v is greater them 2.5, then a Variable flag_v is updated (S1309).

If the value which is obtained by dividing (ave_v−min_v) by the variable s_v is not greater than 2.5, or if the value which is obtained by dividing (max_v−ave_v) by the variable s_v is not greater than 2.5, or if the variable flag_v has been updated, then a variable "count" is updated (S1310). If the variable "count" is 60 (following the YES path from S1311), then the cell is determined as abnormal (S1312). If the variable "count" is not 60 (following the NO path from S1311), or if the cell has been determined as abnormal, then the unusual heating detection process is terminated.

Referring to FIG. 14, a variable initialization process will be described. The variables flight —v and count are initialized (S1401), and the variable initialization process ie terminated.

Referring to FIG. 15, a cell abnormality determination process will be described. It is determined whether or not the variable flag_v in equal to or greater than 48 (S1501). If the variable flag_v is equal to or greater than 48, then a failure process is performed (S1502). If the variable flag_v is not equal to or greater than 48, or if a failure process has been performed, then the variables, flag_v and count are initialized (S1503), and the cell abnormality determination process is terminated.

Figure 16:
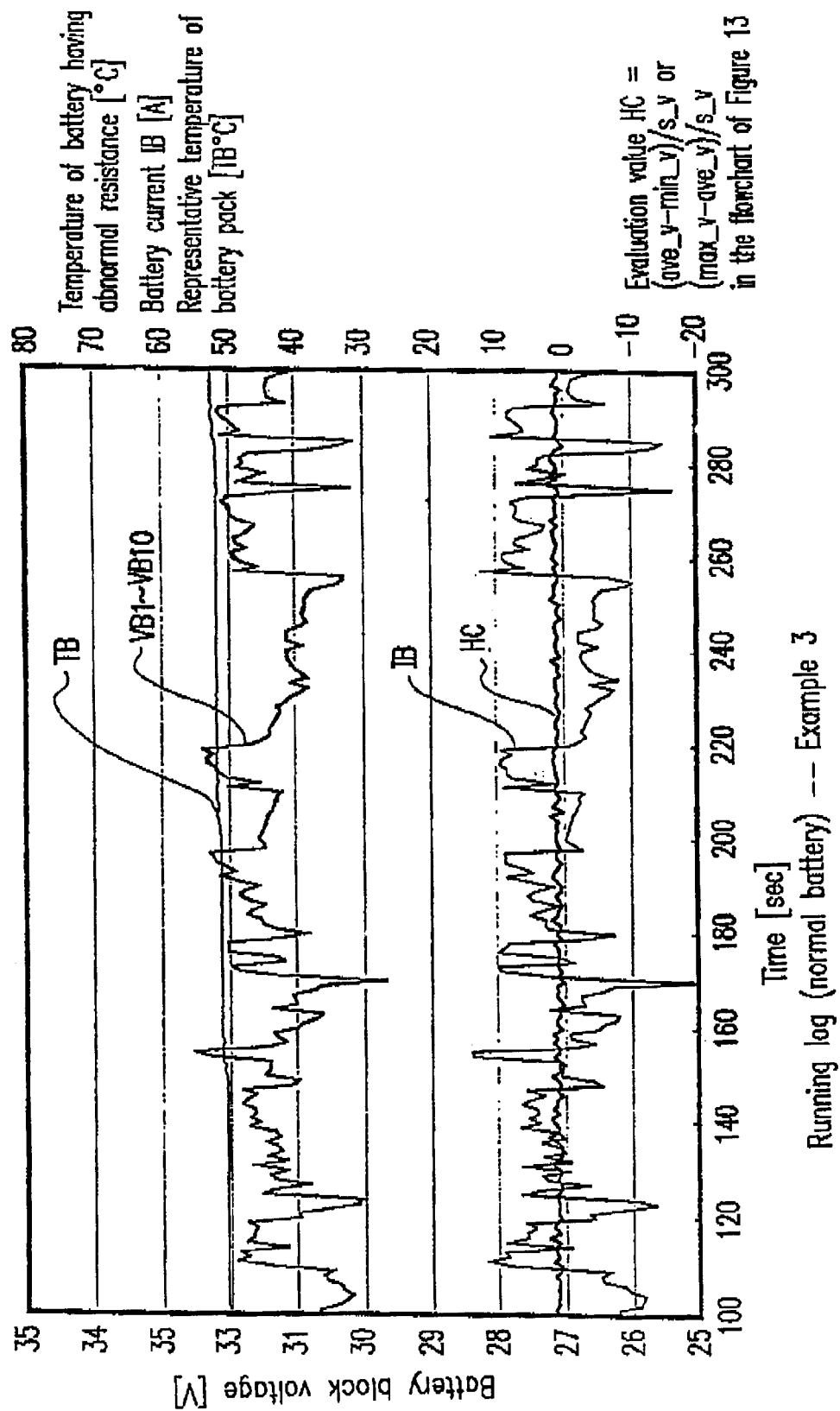
FIG. 16 is a graph showing an exemplary running log of the battery block voltages of a normal battery pack according to Example 3 of the present invention.
Figure 17:
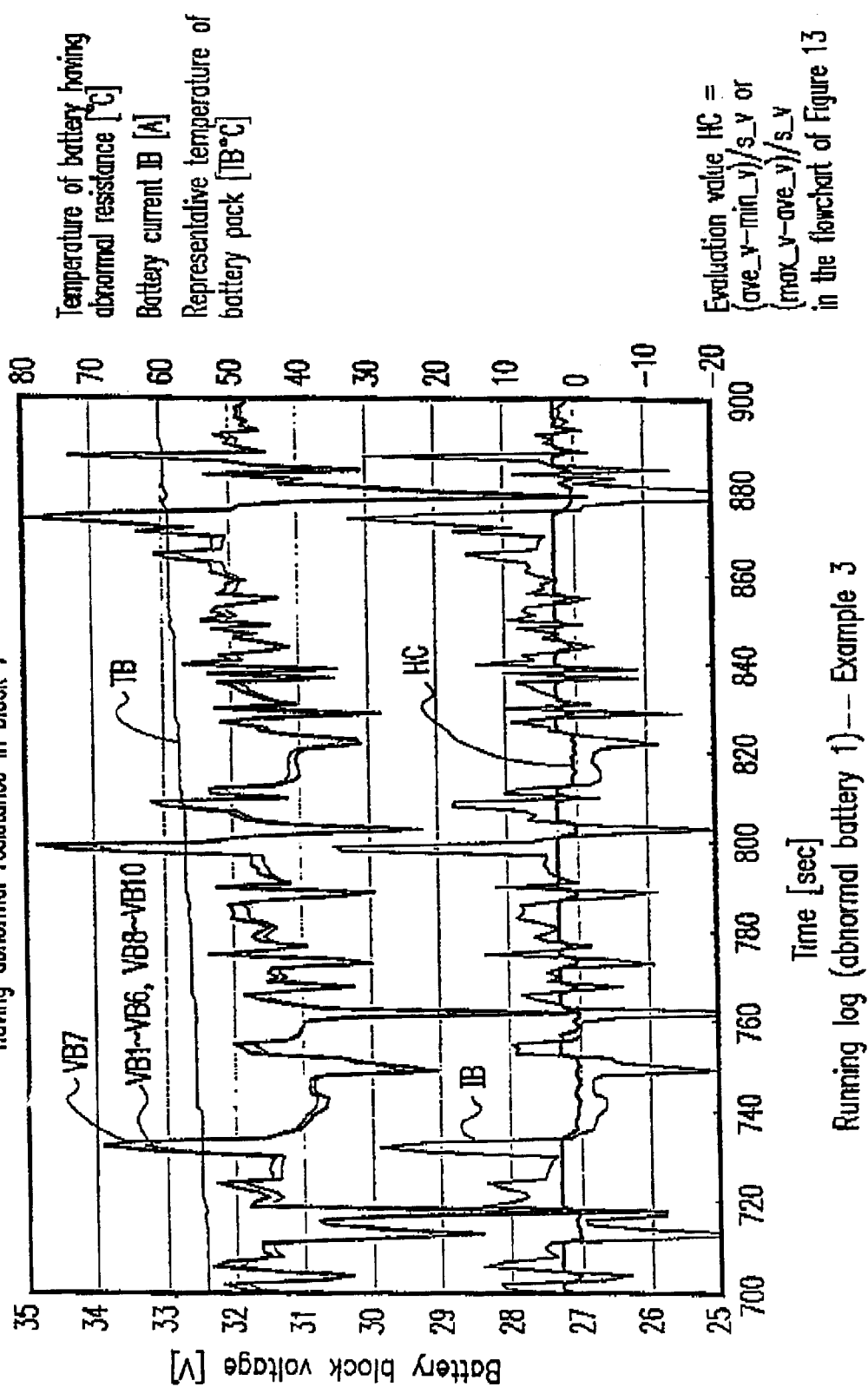
FIG. 17 is a graph showing an exemplary running log of the battery block voltages of a battery pack which includes a cell having abnormal resistance according to Example 3 of the present invention.

FIG. 16 is a graph showing an exemplary running log of the battery block voltages of a normal battery pack according to Example 3 of the present invention. FIG. 17 in a graph showing an exemplary running log of the battery block voltages of a battery park which includes a battery having abnormal resistance according to Example 3 of the present invention.

Referring to FIGS. 16 and 17, the unusual heating of a cell 10B can be detected based on an evaluation value HC, which in turn is based on the average value and the variance σ² of the block voltages of the plurality of blocks 10A. Herein, the evaluation value HC corresponds to (ave_v−min_v)/s_v or (max_v−ave_v)/s_v used in stop 91307 of the unusual heating detection process described above with reference to FIG. 13. The average value of the block voltages of the blocks 10A corresponds to the, Variable ave_v. The variance σ of the block voltages of the blocks 10A corresponds to the variable s_v.

It should be noted that, when a malfunctioning battery ie replaced by a new battery, the new battery has such a small IR value that its block voltage may not be greater than −2.5 σ² at the time of charging. According to the present example, however, the only malfunctioning batteries that can be determined at the time of charging are those in which at least one of the block voltages of the blocks 10A in equal to or greater than +2.5 σ². Thus, misdetection possibilities are eliminated.

Thus, according to Example 3, the variance calculation section 4C calculates an average value and a variance σ² of the block voltages of a plurality of blocks 10A and the variance unusual heating detection section 4D detects unusual heating of one or more cells 10B based on the average value and the variance σ² of the block voltages of the plurality of blocks 10A. As a result, the errors associated with temperature compensation can be minimized, and the detection accuracy of batteries having abnormal resistance can be improved.

In the case where it is impossible to input power to or output power from the battery pack 10 under a low temperature condition, or where the battery current only undergoes small changes (as in the case of a small load or constant current charging/discharging), the method according to Example 3 of the present invention can provide satisfactory detection results, whereas a least squares method would not be able to achieve an equally high level of abnormal battery detection accuracy.

EXAMPLE 4

Example 4 of the present invention differs from Example 3 in that the variance calculation section 4C calculates an average voltage difference value representing an average of voltage differences, each measured between a block voltage value of one of a plurality of blocks 10A at a first time and a block voltage value of that block 10A at a second time as well as a voltage differences variance representing a variance of the voltage differences; and that the variance unusual heating detection section 4D detects unusual rising of the internal resistance of one or more calls 10B based on the voltage differences, the average voltage difference value, and the voltage difference variance.

According to Example 4, the voltage differences of the respective block voltages between the first time and the second time are subjected to statistical processing, and any block 10A that substantially falls outside the range of the others is determined as malfunctioning, whereupon the input to or output from the battery pack 10 will be restricted.

Figure 18:
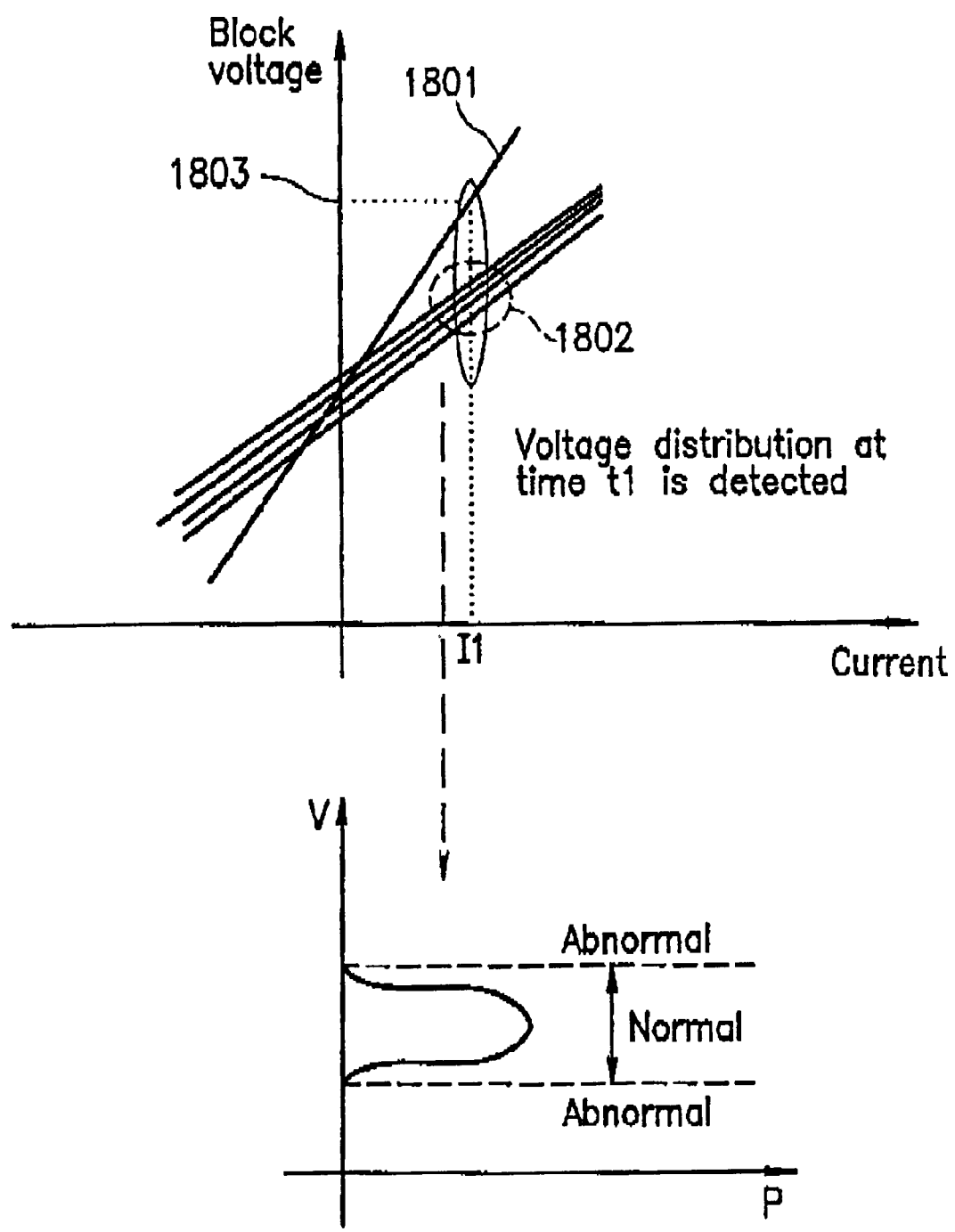
FIG. 18 is a graph illustrating a method for detecting unusual rising of internal resistance according to Example 4 of the present invention.
Figure 19:
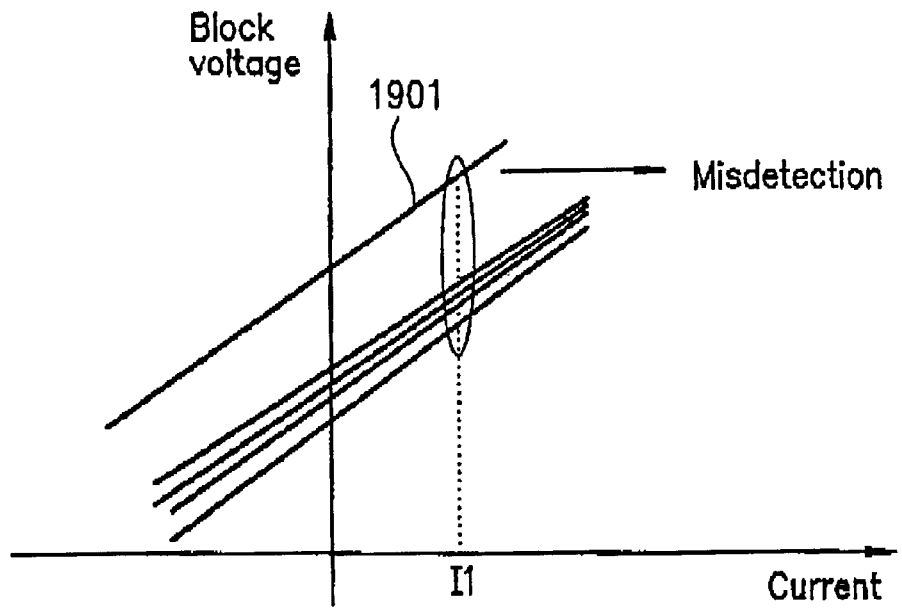
FIG. 19 is a graph illustrating how a misdetection of unusual rising of internal resistance may occur.
Figure 20:
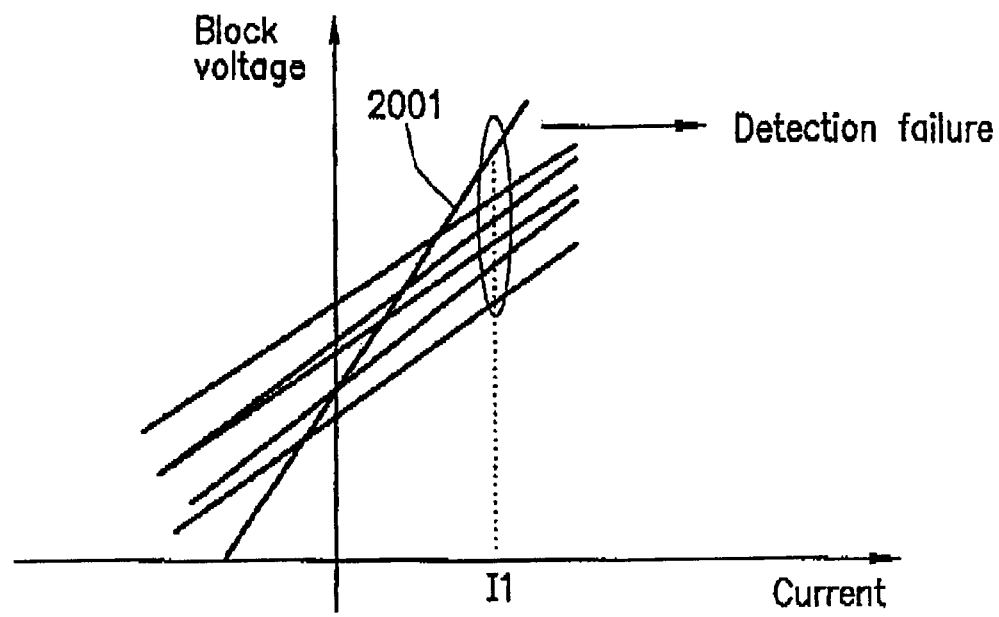
FIG. 20 is a graph illustrating a detection failure (or "overlooking") of unusual rising of internal resistance.

FIG. 18 is a graph illustrating a method for detecting unusual rising of internal resistance according to Example 4 of the present invention. FIG. 19 in a graph illustrating how a misdetection of unusual rising of internal resistance may occur. FIG. 20 in a graph illustrating a detection failure (or "overlooking") of unusual rising of internal resistance.

According to Example 4, an shown in FIG. 18, block voltages are subjected to statistical processing such that the internal resistance of any cell 10B that corresponds to a curve 1801 which takes, e.g., a block voltage 1803 on the vertical axis when a current I1 is flowing at time t1 is determined to be at an unusual level, because the block voltage 1803 substantially lies outside the distribution pattern 1802 of the rest of the black voltages.

However, processing instantaneous values of block voltages when a current I1 in flowing at time t1 is susceptible to fluctuations in the available capacity of the cell 10B. As a result, the OVE (open circuit voltages: an intersection on the vertical axis (V), at which there is a zero current (I=0) flowing) may fluctuate from block voltage to block voltage, as shown in FIG. 19. In this case, one or more cells 10B in a block corresponding to a curve 1901 may be erroneously determined as having an unusually high internal resistance, which is not the case (a "misdetection").

Detecting instantaneous values of block voltages is susceptible to failure to detect a cell 10B which actually has an unusually high internal resistance, e.g., a cell 10B corresponding to a curve 2001 shown in FIG. 20 (a "detection failure" or "overlooking").

Figure 21:
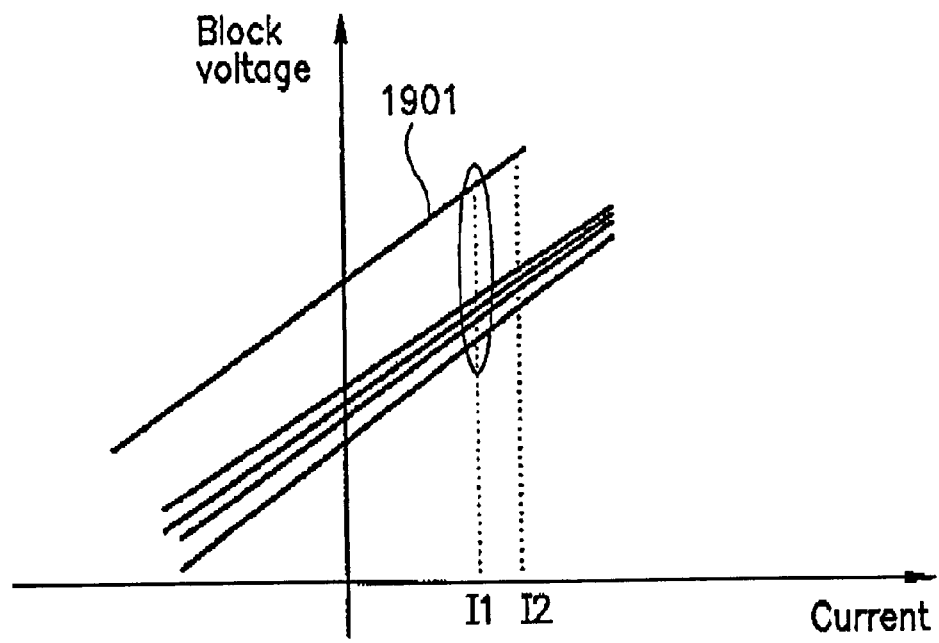
FIG. 21 is a graph illustrating a method for detecting unusual rising of internal resistance based on voltage differences according to Example 4 of the present invention.
Figure 22:
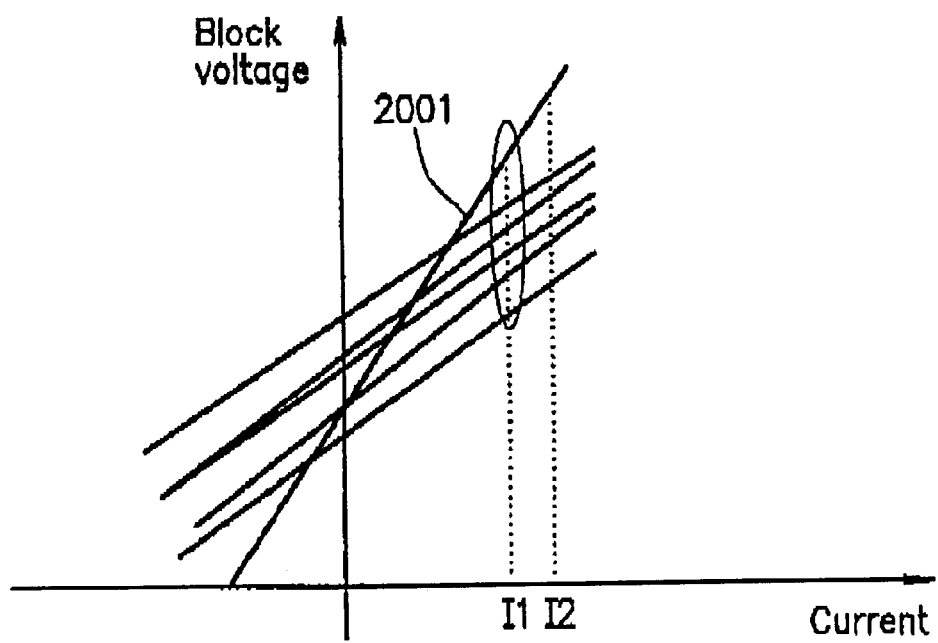
FIG. 22 is a graph illustrating a method for detecting unusual rising of internal resistance based on voltage differences according to Example 4 of the present invention.

FIGS. 21 and 22 are graphs illustrating a method for detecting unusual rising of internal resistance based on voltage differences according to Example 4 of the present invention. According to Example 4, as shown in FIGS. 21 and 22, an unusual rising of the internal resistance of one or more cells 10B is detected based on an average of voltage differences between the respective block voltages of a plurality of blocks 10A at time t1 when a current I1 is flowing and the respective block voltages of the blocks 10A at time t2 when a current I2 is flowing an well as a variance of the voltage differences.

According to Example 4, an unusual rising of the internal resistance of one or more cells 10B is detected based on voltage differences between the respective block voltages of a plurality of blocks 10A at time t1 when a current I1 is flowing and the respective block voltages of the blocks 10A at time t2 when a current I2 In flowing, as shown in FIG. 21. Thus, a curve 1901 will be determined an normal unlike in the example illustrated in FIG. 19, thereby preventing misdetections.

According to Example 4, an unusual rising of the internal resistance of one or more cells 10B is detected based on voltage differences between the respective block voltages of a plurality of blocks 10A at time t1 when a current I1 is flowing and the respective block voltages of the blocks 10A at time t2 when a current I2 is flowing, as shown in FIG. 22. Thus, a curve 2001 will be determined an abnormal unlike in the example illustrated in FIG. 20, thereby preventing detection failure.

Figure 23:
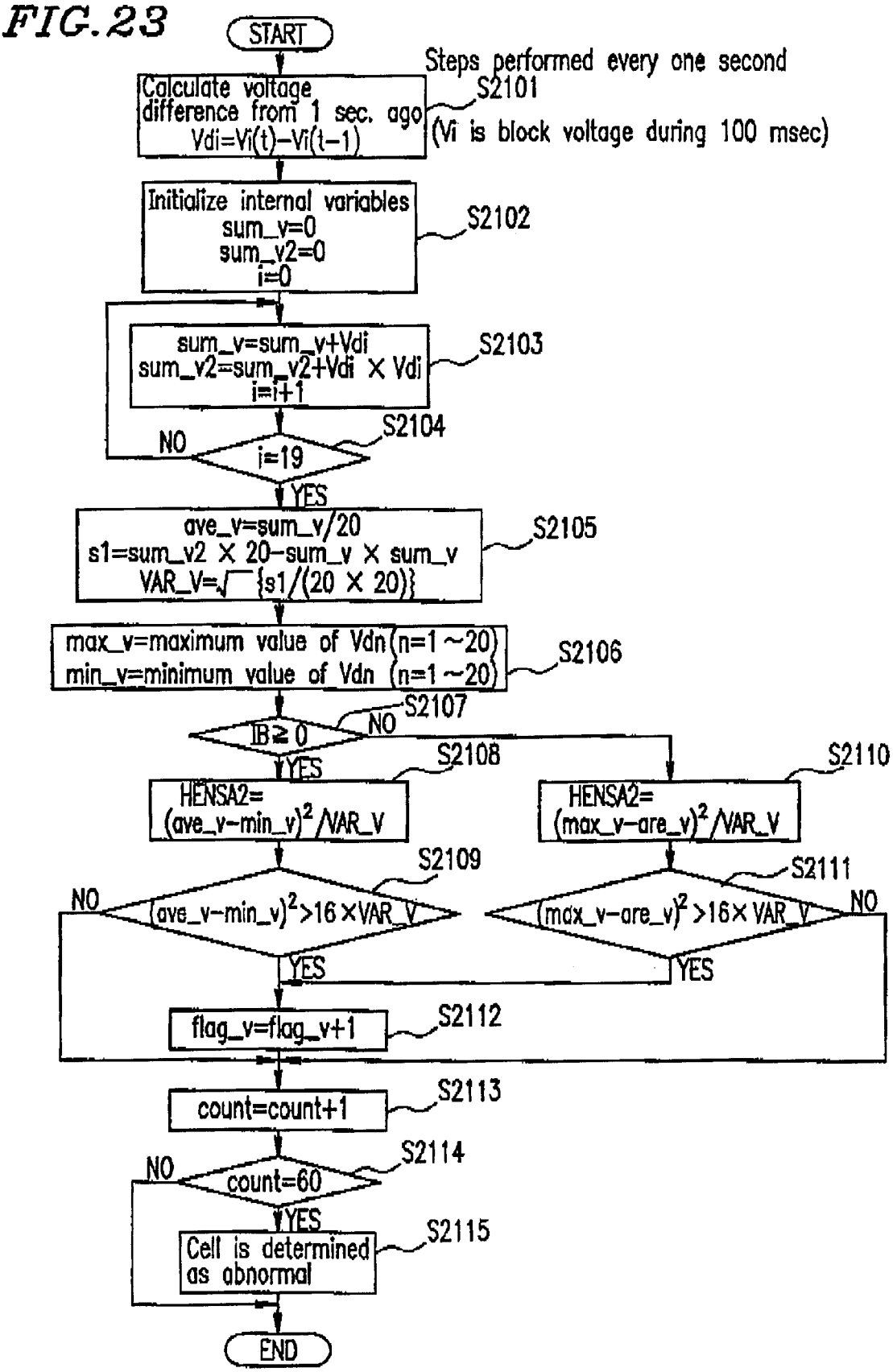
FIG. 23 is a flowchart illustrating the procedure of an unusual heating detection process during the control of a battery pack 10 according to Example 4 of the present invention.
Figure 24:
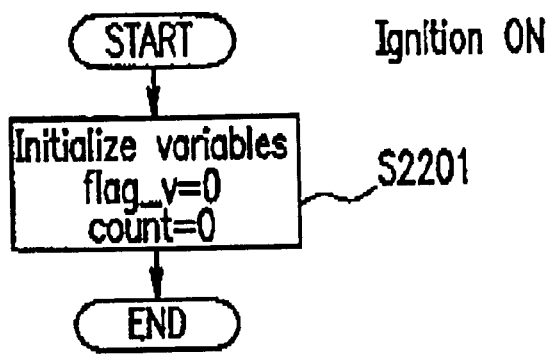
FIG. 24 is a flowchart illustrating the procedure of a variable initialization process during the control of the battery pack 10 according to Example 4 of the present invention.
Figure 25:
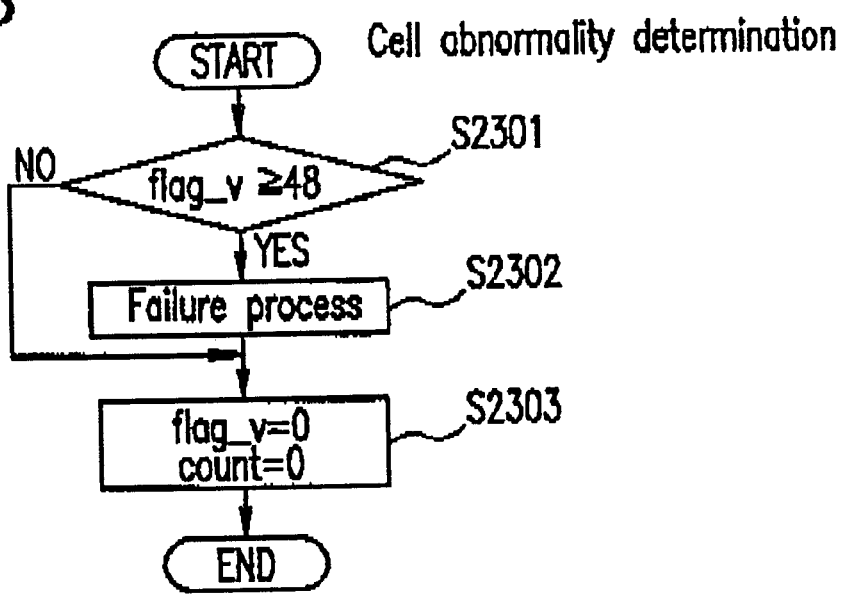
FIG. 25 is a flowchart illustrating the procedure of a cell abnormality determination process during the control of the battery pack 10 according to Example 4 of the present invention.

FIG. 23 is a flowchart illustrating the procedure of an unusual heating detection process during the control of a battery pack 10 according to Example 4 of the present invention. FIG. 24 is a flowchart illustrating the procedure of a variable initialization process during the control of the battery pack 10. FIG. 25 is a flowchart illustrating the procedure of a cell abnormality determination process.

As described above, according to Example 4, statistical processing of differences between block voltages occurring over a predetermined period of time (e.g. 1 second) is used, rather than instantaneous block voltage values. According to this method, the influences of OCV fluctuation can be removed, as seen from eq. 1, eq. 2, and eq. 3 below:

$$Vn(t)=OCVn+I(t) \cdot IRn \qquad \text{eq. 1}$$

$$Vn(t+\Delta t)=OCVn+I(t+\Delta t) \cdot IRn \qquad \text{eq. 2}$$

$$Vn(t+\Delta t)-Vn(t)=IRn \cdot [I(t+\Delta t)-I(t)] \qquad \text{eq. 3}$$

As can be seen, in eq. 3, the influences of OCV fluctuation has been removed.

The block voltages at a time when current $I1 \approx 0$ is satisfied maybe measured, e.g. at the start of the entire control.

Referring to FIG. 23, a voltage difference Vd1 between, block voltages Vi(t) and Vi(t−1), which are one second apart from each other, is calculated (S2101). Internal variables sum_v; and sum_v2, and a timer variable i are initialized (S2102). A variable Vd_i is added to the internal variable sum_v; (Vdi×Vdi) is added to the internal variable sum_v2; and the timer variable i is updated (S2103). If the timer variable is not equal to 19 (following the No path from S2104), the process of S2l03 is repeated.

If the timer variable is equal to 19 (following the YES Path from S2104), a value obtained by dividing the internal variable sum_v by twenty is substituted for a variable ave_v; a value calculated as a function of the internal variable sum_v and the internal variable sum_v2 is substituted for a variable s1; and a value calculated as a function of the variable s1 is substituted for a variable s_v (S2105). A maximum value of a variable Vdn is substituted for a variable max_v: and a minimum value of the variable Vdn is substituted for a variable min_v (S2106).

It is determined whether or not a variable IB is equal to or greater than zero (S2107). if the variable IB is equal to or greater than zero, then a value obtained by dividing a square of (ave_v−min_v) by a variable VAR_V is substituted for a variable HENSA2 (S2108).

It is determined whether or not the square of (ave_v−min_v) is greater than 16 times the variable VAR_V (S2109).

If the variable IB is smaller than zero, then a value which is obtained by dividing a square of (max_v−ave_v) by the variable VAR_V is substituted for the variable HENSA2 (S2110).

It is determined whether or not the square of (max_v−ave_v) is greater than 16 times the variable VAR_V (S2111).

If the square of (ave_v−min_v) in greater than 16 times the variable VAR_V, or if the square of (max_v−ave_v) is greater than 16 times the variable VAR_V, then a variable flag_v is updated (S2112).

If the square of (ave_v—min_v) is not greater than 16 times the variable VAR_V, or if the square of (max_v−ave_v) is not greater than 16 times the variable VAR_V, or if the variable flag_v has been updated, then a variable "count" is updated (S2113). If the variable "count" is 60 (following the YES path from S2114), then the cell is determined as abnormal (S2115). If the variable "count" is not 60 (following the NO path from S2114), or if the cell has been determined as abnormal, then the unusual heating detection process is terminated.

Referring to FIG. 24, a variable initialization process will be described. The variables flag_v and count are initialized (S2201), and the variable initialization process in terminated.

Referring to FIG. 25, a cell abnormality determination process will be described it is determined whether or not the variable flag_v is equal to or greater than 48 (S2301). if the variable flag_v is equal to or greater than 48, then a failure process is performed (S2302). If the variable flag_v is not equal to or greater than 48, or if a failure process has been performed, then the variables flag_v and count are initialized (S2303), and the cell abnormality determination process is terminated.

Thus according to Example 4 of the present invention, the variance calculation section 4C calculates an average voltage difference value representing an average of voltage differences, each measured between a block voltage value of one of a plurality of blacks 10A at a first time and a block voltage value of that block 10A at a second time as well as a voltage difference variance representing a variance of the voltage differences; and that the variance unusual heating detection section 4D detects unusual rising of the internal resistance of one or more cells 10B based on the voltage differences, the average voltage difference value, and the voltage difference variance. As a result, misdetections and detection failures are prevented even if the available capacity and the OCVs of the cells 10B happen to vary.

EXAMPLE 5

According to Example 5 of the present invention, a battery pack controlling apparatus for univocally determining the available capacity of each block based on the behavior of a battery current and battery voltages is employed in such a manner that, if both a high available capacity diagnose and a low available capacity diagnosis are given for a given block, that block is determined as abnormal and the input to or output from the battery pack 10 is restricted.

The variable capacity unusual heating detection section 4E detects an unusual heating of one or more cells 10B based on the available capacity of each block 10A. The vehicle controlling section 5 controls the battery power input/output section 1 based on the results of unusual heating detection by the available capacity unusual heating detection section 4E.

Figure 26:
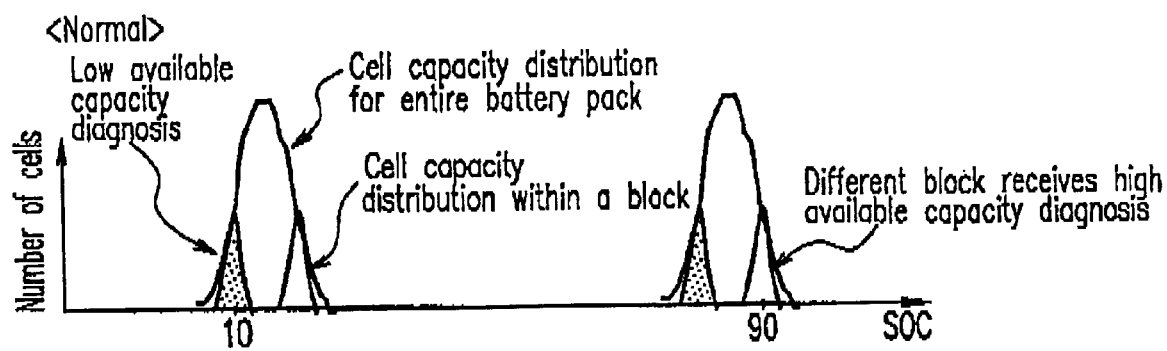
FIG. 26 is a graph illustrating a available capacity distribution of cells in a normal battery pack according to Example 5 of the present invention.
Figure 27:
FIG. 27 is a graph illustrating a available capacity distribution of cells in a battery pack which includes a cell having abnormal resistance according to Example 5 of the present invention.

FIG. 26 is a graph illustrating a available capacity distribution of cells in a normal battery pack according to Example 5 of the present invention. FIG. 27 is a graph illustrating a available capacity distribution of cells in a battery pack which includes a battery having abnormal resistance specifically, FIGS. 26 and 27 each illustrate a available capacity distribution pattern of blocks including normal (FIG. 26) or abnormal (FIG. 27) cells 10B in the case where a battery pack 10 is used in a range such that a minimum available capacity of each block 10A in equal to or greater than 10% and a maximum available capacity of each block 10A is equal to or smaller than 90%.

When the available capacity of batteries are univocally determined based on the relationship between a battery current and battery voltages at the time of discharging, a high available capacity diagnosis and a low available capacity diagnosis will be given for respectively different blacks of a normal battery pack, as shown in FIG. 26. On the other hand, in the case of a battery pack including abnormal batteries, both a high available capacity diagnosis and a low available capacity diagnosis will be given for the same block, as shown in FIG. 27.

Figure 28:
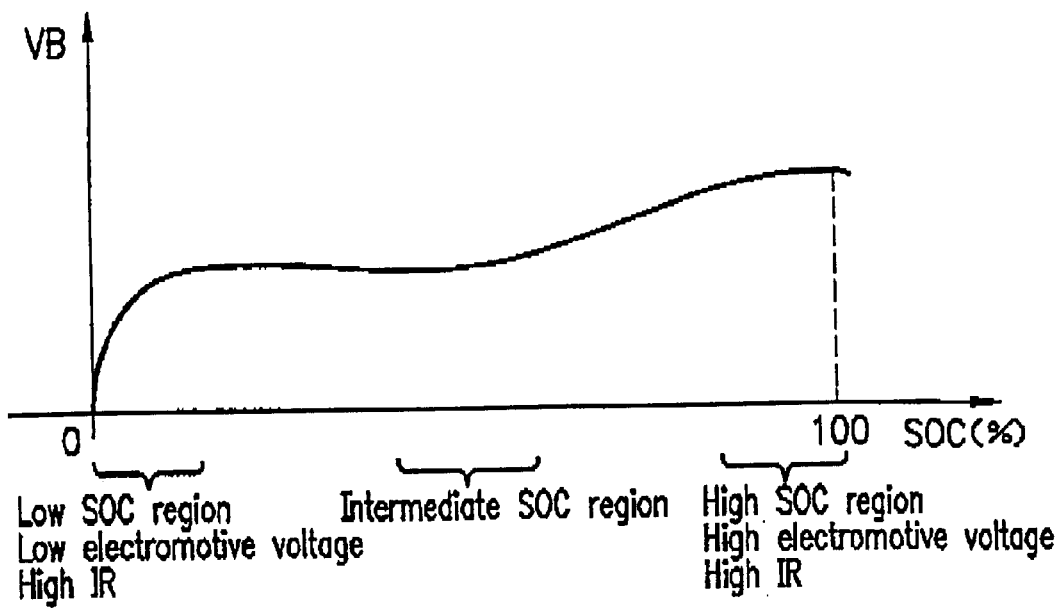
FIG. 28 is a graph illustrating a relationship between a available capacity (SOC) and a block voltage (VB).
Figure 29:
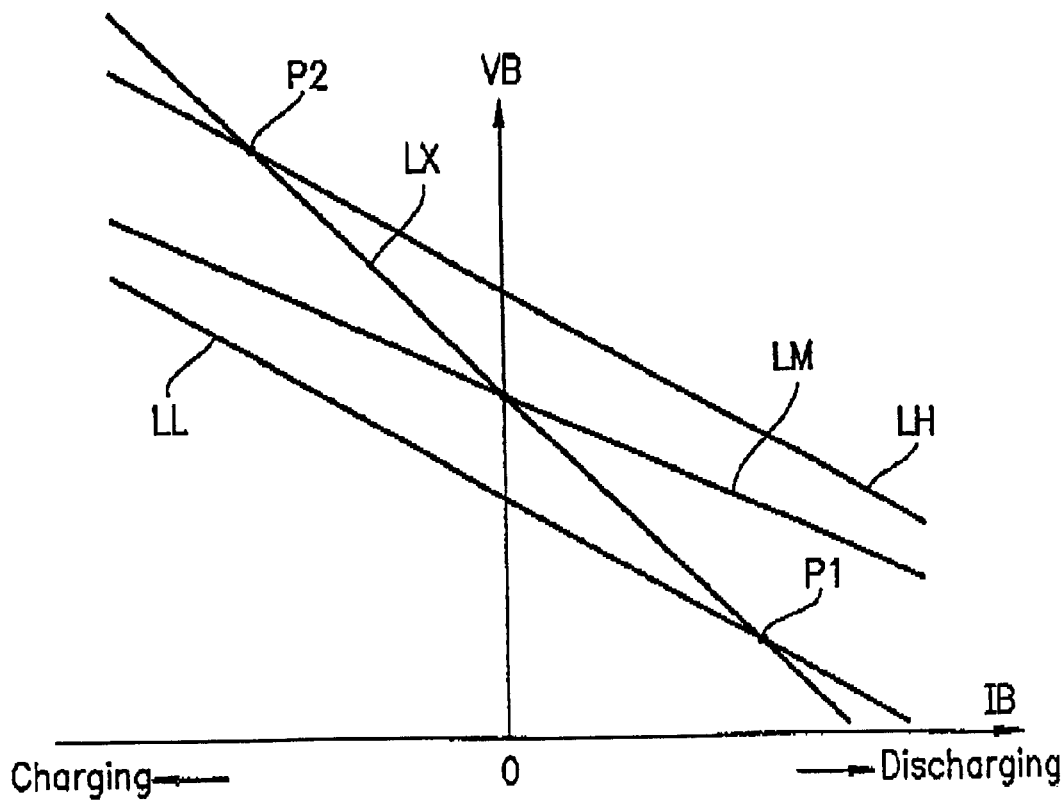
FIG. 29 is a graph illustrating a relationship between a battery current (IB) and a block voltage (VB).

FIG. 28 is a graph illustrating a relationship between a available capacity (SOC) and a block voltage (VB). FIG. 29 is a graph illustrating a relationship between a battery current (IB) and a block voltage (VB). As seen from FIG. 28, the block voltage of a battery decreases as its available capacity (SOC) decreases.

Referring to FIGS. 28 and 29, within an intermediate region of available capacity, the battery current and block voltages change as indicated by a line LM in FIG. 29. In a high SOC region, both the block voltage (VB) and the internal resistance increase as compared to those in the intermediate region; therefore, the battery current and block voltages change as indicated by a line LH in FIG. 29. In a low SOC region, the block voltage (VB) decreases, and the internal resistance increases, as compared to those in the intermediate region therefore, the battery current and block voltages change as indicated by a line LL in FIG. 29.

In a block including any abnormal cells having unusually high internal resistance, the battery current and block voltages will change as indicated by a line LX in FIG. 29, which intersects the line LH at a point P2 and the line LL at a point P1.

Thus it will be seen that a block including any abnormal cells having unusually high internal resistance would qualify for a battery in the high SOC region and for a battery in the low SOC region. Therefore, identifying the available capacity of a block including any abnormal cells having unusually high internal resistance based on the battery current (IB) and the block voltages (VB) might introduce misdetection possibilities.

The available capacity unusual heating detection section 4E determines that the battery pack is normal if a high available capacity diagnosis and a low available capacity diagnosis are given for respectively different blocks therein.

On the other hand, if it is determined that both a high available capacity diagnosis and a low available capacity diagnosis are given for the same block, the available capacity unusual heating detection section 4E determines unusual heating of the cells 10B included in that block.

Thus, according to Example 5, the available capacity unusual heating detection section 4E detects unusual heating of one or more cells 10B based on high available capacity diagnoses and low available capacity diagnoses for a plurality of blocks 10A, and the vehicle controlling section 5 controls the battery power input/output section 1 based on the results of unusual heating detection by the available capacity unusual heating detection section 4E. Therefore, there is no need to mount a temperature sensor on each one of a plurality of cells 10B, so that it is possible to control the battery pack 10 in an economical manner.

Although illustrated as including a plurality of cells 10B in the above-described examples, each of the plurality of blocks, 10A may instead be composed of a plurality of battery modules.

Thus, according to the present invention, there is provided an economical battery pack controlling apparatus which obviates the need for mounting a temperature sensor to each one of a number of cells.

Moreover, according to the present invention, there is provided a battery pack controlling apparatus which is capable of controlling the input and output of a battery pack responsive to an increase in the temperature of a cell, so as to prevent the cell from remaining in an abnormal condition.

Furthermore, according to the present invention, there is provided a battery pack controlling apparatus which is capable of controlling the increase in the temperature of cells, so that the entire battery pack can sustain a longer period of use.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A battery pack controlling apparatus for controlling input to or output from a battery pack, wherein:

the battery pack comprises a plurality of blocks in series connection; and each of the plurality of blocks includes a plurality of batteries in series connection, the battery pack controlling apparatus comprising;

a battery power input/output section for controlling input and output of battery power to and from the battery pack;

a block voltage detection section for detecting a block voltage of each of the plurality of blocks;

a battery current detection section for detecting a battery current of the battery pack;

an unusual heating detection section for detecting unusual heating of at least one of the plurality of batteries based on the block voltage a nd the battery current; and a vehicle controlling section for controlling the battery power input/output section based on results of unusual heating detection by the unusual heating detection section, wherein the unusual heating detection section includes an internal resistance calculation section for calculating an internal resistance of each of the plurality of blocks based on the block voltage and the battery current, and wherein the unusual heating detection section detects unusual heating of the at least one of the plurality of batteries based on the internal resistance of each of the plurality of blocks and a predetermined threshold value.

2. A battery pack controlling apparatus according to claim 1, wherein:

the battery pack controlling apparatus further comprises a battery temperature detection section for detecting a battery temperature of the battery pack;

the unusual heating detection section further comprises a threshold value setting section for setting the predetermined threshold value based on the battery temperature of the battery pack; and the unusual heated detection section detects unusual heating of the at least one of the plurality of batteries based on the internal resistance of each of the plurality of blocks and the predetermined threshold value as set by the threshold value setting section.

3. A battery pack controlling apparatus according to claim 1, wherein the vehicle controlling section controls the battery power input/output section in a stepwise manner based on results of unusual heating detection by the unusual heating detection section.

4. A battery pack controlling apparatus according to claim 1, wherein the unusual heating detection section further comprises:

a variance calculation section for calculating an average value and a variance $\sigma^2$ of the block voltages of the plurality of blocks; and a variance unusual heating detection section for detecting unusual rising of the internal resistance of the at least one of the plurality of batteries based on the block voltage of each of the plurality of blocks, the average value, and the variance $\sigma^2$, and wherein the vehicle controlling section controls the battery power input/output section based on results of unusual rising detection by the variance unusual heating detection section.

5. A battery pack controlling apparatus according to claim 4, wherein the variance unusual heating detection section determines unusual rising of the internal resistance of the at least one of the plurality of batteries when at least one of the block voltages is equal to or greater than a predetermined value at a time of charging or when at least one of the block voltages is equal to or smaller than a predetermined value at a time of discharging.

6. A battery park controlling apparatus according to claim 4, wherein the variance calculation section calculates an average voltage difference value representing an average of voltage differences between the block voltage at a first time and the block voltage at a second time as well as a voltage difference variance representing a variance of the voltage differences, and wherein the variance unusual heating detection section detects unusual rising of the internal resistance of the at least one of the plurality of batteries based on the voltage differences, the average voltage difference value, and the voltage difference variance.

7. A battery pack controlling apparatus according to claim 6, wherein the first time comprises a point in time at which the battery current detected by the battery current detection section is substantially zero.

8. A battery pack controlling apparatus according to claim 1, wherein the unusual heating detection section comprises a available capacity unusual heating detection section for detecting unusual rising of the internal resistance of the at least one of the plurality of batteries based on high available capacity diagnosis and low available capacity diagnosis for respective ones of the plurality of blocks, and wherein the vehicle controlling section controls the battery power input/output section based on results of unusual rising detection by the available capacity unusual heating detection section.

* * * * *